United States Patent
Gomez Fernandez et al.

(10) Patent No.: US 12,197,965 B1
(45) Date of Patent: Jan. 14, 2025

(54) SYSTEMS AND METHODS FOR DYNAMIC SEMAPHORE ASSIGNMENT IN MULTI-USER COLLABORATIVE ENVIRONMENTS

(71) Applicant: Apple Inc., Cupertino, CA (US)

(72) Inventors: Pedro Fernando Gomez Fernandez, San Francisco, CA (US); Ronald V. Siy, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/176,412

(22) Filed: Feb. 28, 2023

Related U.S. Application Data

(60) Provisional application No. 63/269,970, filed on Mar. 25, 2022.

(51) Int. Cl.
  G06F 9/52      (2006.01)
  G06F 3/04883   (2022.01)

(52) U.S. Cl.
  CPC ............ *G06F 9/52* (2013.01); *G06F 3/04883* (2013.01)

(58) Field of Classification Search
  None
  See application file for complete search history.

(56) References Cited

U.S. PATENT DOCUMENTS 6,560,627 B1 * 5/2003 McDonald ................ G06F 9/52
                                                718/103

OTHER PUBLICATIONS

Co-Creation, Gravity Sketch User Guide 2020 (Live)—Google Slides [online]. Steam, 2021 [retrieved on May 17, 2023]., Retrieved from the Internet: <URL: https://docs.google.com/presentation/d/e/2PACX-1vSbGZQImrieg7B2Yi1PZIxQX-3_rc7s78f_mNxWcKzEk1C2TwpabJNK5IGfQcT2BS_GFsrl6CoB-F0/pub?start=false&loop=true&delayms=60000&slide=id.g97475c209a_0_395>, Chapter 9, pp. 81-85.

Collaborate in Gravity Sketch. Introducing LandingPad Collab!, Gravity Sketch [online]. Gravity Sketch, 2021 [retrieved on May 18, 2023]. Retrieved from the Internet: <URL: https://www.gravitysketch.com/blog/updates/collaborate-in-gravity-sketch-introducing-landingpad-collab/>, Nov. 5, 2021, 8 pages.

(Continued)

*Primary Examiner* — Farley Abad
*Assistant Examiner* — Dayton Lewis-Taylor
(74) *Attorney, Agent, or Firm* — Kubota & Basol LLP

(57) ABSTRACT

Collaborative environments can allow multiple users access to view and modify objects. In order to avoid conflicting requests from different users to modify objects in the environment, virtual semaphore objects can be made available to users in a collaborative environment. A virtual semaphore can confer an ability to edit or modify objects in the environment, upon being assigned to a user. Users can request changes to user-semaphore assignments, including summoning a semaphore to be self-assigned, surrendering a self-assigned semaphore, transferring a semaphore from one user to another, and scheduling a semaphore assignment to a particular user at a future time. Upon assignment to a particular user, a virtual semaphore can be moved to a location close to a virtual representation of the particular user. Users can request changes to user-semaphore assignments using input devices by making selections in a graphical user interface, or by performing gestures associated with virtual semaphores.

20 Claims, 12 Drawing Sheets

(56) References Cited

OTHER PUBLICATIONS

Gravity Sketch—Co-Creation, Gravity Sketch [online]. YouTube, 2020 [retrieved on May 18, 2023]. Retrieved from the Internet: <URL: https://www.youtube.com/watch?v=nrgeXJ-wK-Q>, Jul. 25, 2020, 2 pages.

Introducing LandingPad Collab!, Gravity Sketch [online]. YouTube, 2021 [retrieved on May 18, 2023]. Retrieved from the Internet: <URL: https://www.youtube.com/watch?v=888hNzQJurg >, Nov. 5, 2021, 2 pages.

LandingPad Collab Teaser, Gravity Sketch [online]. YouTube, 2021 [retrieved on May 18, 2023]. Retrieved from the Internet: <URL: https://www.youtube.com/watch?v=IOvVoo892bc>, Sep. 20, 2021, 2 pages.

\* cited by examiner

| | Current Semaphore Assignment | Elapsed Time | Semaphore 306A (Session) | Semaphore 306B (Session) | Semaphore 306C (Session) | Semaphore 306A (Historical) | Semaphore 306B (Historical) | Semaphore 306C (Historical) | User-Specific Restrictions/ Rules |
|---|---|---|---|---|---|---|---|---|---|
| User 310A/390A | None | N/A | 00:12:12 | 00:00:00 | 00:00:00 | 00:15:15 | 00:26:26 | 00:37:37 | Highest priority in requests for Semaphore 306A |
| User 310B/390B | None | N/A | 00:13:13 | 00:00:00 | 00:05:05 | 00:16:16 | 00:27:27 | 00:38:38 | Scheduled for assignment of Semaphore 306B, after User 310C/399 assignment quota has elapsed |
| User 310C/399 | 306B | 00:02:22 | 00:14:14 | 01:01:22 | 00:06:06 | 00:17:17 | 00:28:28 | 01:45:45 | Lower priority after 30 minutes of any semaphore assignment (session/historical) |

*FIG. 4*

SYSTEMS AND METHODS FOR DYNAMIC SEMAPHORE ASSIGNMENT IN MULTI-USER COLLABORATIVE ENVIRONMENTS

CROSS-REFERENCE TO RELATED APPLICATIONS

This application claims the benefit of U.S. Provisional Application No. 63/269,970, filed Mar. 25, 2022, the content of which is incorporated herein by reference in its entirety for all purposes.

FIELD OF THE DISCLOSURE

This relates generally to presenting and assigning semaphores to users participating in a multi-user collaborative environment.

BACKGROUND OF THE DISCLOSURE

Multi-user collaboration on media is often desired in business and academic settings. Collaboration on media is relatively simple when one collaborator can access and edit the media at a time, but allowing access and/or editing privileges to multiple users may result in inconsistencies that may make collaboration cumbersome and inefficient.

SUMMARY OF THE DISCLOSURE

This relates to systems and methods for presenting and assigning semaphores to users participating in a multi-user collaborative environment. In particular, this relates to systems and methods for dynamically changing the assignments of semaphores to minimize/eliminate collisions, and improve collaboration between users that are granted write access privileges to objects in the environment. One or more electronic devices can be used as computing resources to host the collaborative environment and provide access to the environment and its contents to multiple users. Users can access the environment and can be visually represented in the environment using a three-dimensional visual representation (e.g., an avatar) that have an anthropomorphized appearance (e.g., a human-shaped representation), or any desired representation within the environment. Within the environment, users can be presented various editable objects. Editable objects presented to users within the environment can represent a data structure, data repository, or any other suitable digital portfolio containing multiple content types (e.g., audio, video, text, two-dimensional model, three-dimensional model, simulations, testbenches, etc.). Computing resources used to host the environment can also host the editable objects, and grant authorized users privileges to view the objects, and optionally discuss/collaborate with respect to the objects. In some examples, the computing resources can provide selective write access for the editable objects to the users within the environment using semaphores. Within the environment, semaphores can have a visual representation that corresponds to a context or content type of at least one editable object or editable object layer. In the context of objects presented in the environment, semaphores can symbolically and visually represent a particular user's permission or authorization to contribute changes to an object or its layers. In some examples, a user assigned a semaphore associated with an object can be afforded privileges to edit, update a state of, or otherwise contribute changes to the object (sometimes referred to as "write access privileges") or its layers.

Computing resources used to host the environment can render or display one or more visual effects corresponding to any user being assigned or de-assigned any semaphore. Examples of visual effects corresponding to a change in user-semaphore assignment can include: moving a visual representation of a semaphore to (or away from) a location within a threshold distance of a visual representation of a user, drawing focus to a user newly assigned a semaphore (e.g., by emphasizing or altering visual attributes of the user's representation), and drawing focus away from users that are not assigned a semaphore (e.g., by de-emphasizing or altering visual attributes of the users' representations). Computing resources used to host the environment can also modify the environment in other ways, based on any user being assigned, or de-assigned any semaphore. Other examples of changes to the environment that are based on user-semaphore assignments can include: measuring and storing user participation metrics and statistics including semaphore assignment times, imposing a schedule of semaphore assignments that automatically request new user-semaphore assignments based on time-based or participation-based criteria, enabling user selections corresponding to requests to change current user-semaphore assignments, amplifying or accentuating an audio input stream from a user assigned a semaphore, and attenuating or distorting audio input streams from users not assigned a semaphore. In some examples, user selections to change current user-semaphore assignments can require computing resources that host the environment to evaluate one or more criteria. In such examples, the computing resources that host the environment fulfill requests to change current user-semaphore assignments in accordance with a determination that the one or more criteria have been satisfied.

BRIEF DESCRIPTION OF THE DRAWINGS

FIG. 4 illustrates exemplary rows and columns of a user-semaphore ledger that can be maintained by a maintenance engine of the environment presentation resources, according to examples of the disclosure.

DETAILED DESCRIPTION

Figure 1:
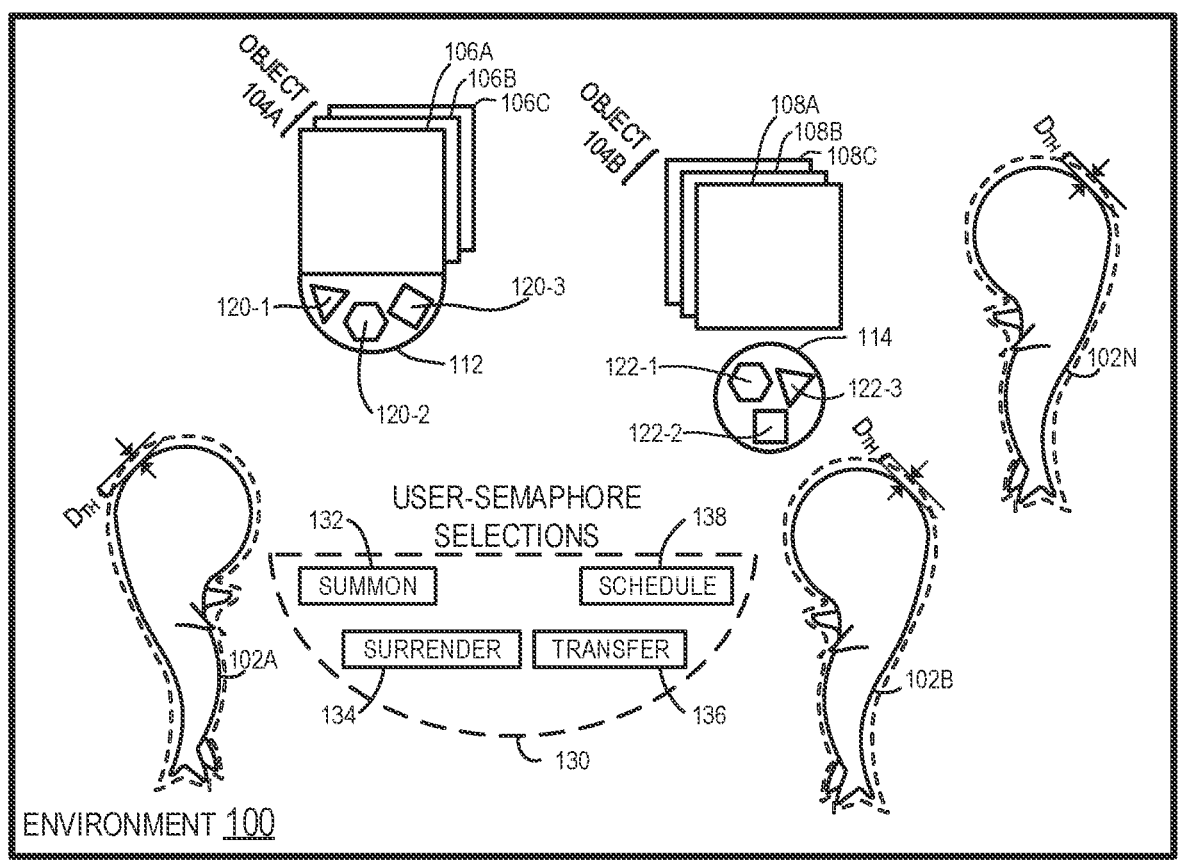
FIG. 1 illustrates an exemplary environment, according to examples of the disclosure.

In the following description of examples, reference is made to the accompanying drawings which form a part hereof, and in which it is shown by way of illustration specific examples that are optionally practiced. It is to be understood that other examples are optionally used, and structural changes are optionally made without departing from the scope of the disclosed examples.

This relates to systems and methods for presenting and assigning semaphores to users participating in a multi-user collaborative environment. In particular, this relates to systems and methods for dynamically changing the assignments of semaphores to minimize/eliminate collisions, and improve collaboration between users that are granted write access privileges to objects in the environment. One or more electronic devices can be used as computing resources to host the collaborative environment and provide access to the environment and its contents to multiple users. Users can access the environment and can be visually represented in the environment using a three-dimensional visual representation (e.g., an avatar) that have an anthropomorphized appearance (e.g., a human-shaped representation), or any desired representation within the environment. Within the environment, users can be presented various editable objects. Editable objects presented to users within the environment can represent a data structure, data repository, or any other suitable digital portfolio containing multiple content types (e.g., audio, video, text, two-dimensional model, three-dimensional model, simulations, testbenches, etc.). Computing resources used to host the environment can also host the editable objects, and grant authorized users privileges to view the objects, and optionally discuss/collaborate with respect to the objects. In some examples, the computing resources can provide selective write access for the editable objects to the users within the environment using semaphores. Within the environment, semaphores can have a visual representation that corresponds to a context or content type of at least one editable object or editable object layer. In the context of objects presented in the environment, semaphores can symbolically and visually represent a particular user's permission or authorization to contribute changes to an object or its layers. In some examples, a user assigned a semaphore associated with an object can be afforded privileges to edit, update a state of, or otherwise contribute changes to the object (sometimes referred to as "write access privileges") or its layers.

Computing resources used to host the environment can render or display one or more visual effects corresponding to any user being assigned or de-assigned any semaphore. Examples of visual effects corresponding to a change in user-semaphore assignment can include: moving a visual representation of a semaphore to (or away from) a location within a threshold distance of a visual representation of a user, drawing focus to a user newly assigned a semaphore (e.g., by emphasizing or altering visual attributes of the user's representation), and drawing focus away from users that are not assigned a semaphore (e.g., by de-emphasizing or altering visual attributes of the users' representations). Computing resources used to host the environment can also modify the environment in other ways, based on any user being assigned, or de-assigned any semaphore. Other examples of changes to the environment that are based on user-semaphore assignments can include: measuring and storing user participation metrics and statistics including semaphore assignment times, imposing a schedule of semaphore assignments that automatically request new user-semaphore assignments based on time-based or participation-based criteria, enabling user selections corresponding to requests to change current user-semaphore assignments, amplifying or accentuating an audio input stream from a user assigned a semaphore, and attenuating or distorting audio input streams from users not assigned a semaphore. In some examples, user selections to change current user-semaphore assignments can require computing resources that host the environment to evaluate one or more criteria. In such examples, the computing resources that host the environment fulfill requests to change current user-semaphore assignments in accordance with a determination that the one or more criteria have been satisfied.

FIG. 1 illustrates an example environment according to examples of the disclosure. In some examples, environment 100 corresponds to a multi-user environment (e.g., an XR environment) that includes representations of participating users 102A, 102B, and 102N, which represent any number N of users who may participate as contributors, collaborators, reviewers, observers, etc. in environment 100. In some examples, environment 100 also includes representations of one or more objects, such as objects 104A and 104B, which correspond to any number of media or data objects within environment 100 that users 102A, 102B, and 102N can view, discuss/collaborate, or contribute changes to, based on the privileges afforded to the respective users at any given time. In some examples, the representations of one or more objects can include applications such as word processing or content creation applications or the underlying content(s) (e.g., a document or three-dimensional model, etc.). In some examples, one or more objects can include various component layers subject to different forms of user interactions. For example, a content creation application may include a component layer for three-dimensional modeling, a component layer for text, a component layer for lighting, a component layer for audio, etc. In some examples, users are afforded privileges to edit, update a state of, or otherwise contribute changes to an object (sometimes referred to as "write access privileges" or "editing privileges" herein for brevity) or one or more component layers of the object. In some examples of the disclosure, such write access privileges are afforded to a user by assignment of a semaphore and/or revoked by de-assignment of the semaphore. The use of a semaphore to grant editing privileges can prevent conflicts of different user's attempting to make edits to an object or one of its component layers at the same time. The use of a semaphore to grant editing privileges can also prevent unauthorized editing of an object or one of its component layers by unauthorized users.

FIG. 1 also illustrates example representations of semaphores, semaphore receptacles, and user interface for control of the semaphores. As described herein, in some examples, the semaphore can be a virtual semaphore presented to a user in extended reality, discussed in greater detail below in connection with one or more first semaphores 120-1, 120-2, and 120-3 and/or one or more second semaphores 122-1, 122-2, and 122-3. In some examples, the one or more first semaphores 120-1, 120-2, and 120-3 or the one or more second semaphores 122-1, 122-2, and 122-3 are presented in one or more semaphore receptacles (e.g., semaphore receptacle 112 or 114). In some examples, the one or more semaphores are presented in the environment without using semaphore receptacles. In some examples, one or more semaphores are associated with a specific object (and/or with its one or more component layers). For example, one or more first semaphores 120-1, 120-2, and 120-3 presented in semaphore receptacle 112 are associated with a specific object 104A (and/or with its one or more component layers). In some examples, one or more semaphores are available for use with one or multiple objects (and/or with their component layers). For example, one or more second semaphores 122-1, 122-2, and 122-3 presented in semaphore receptacle 114 are optionally associated with objects 104A and 104B (and/or their respective component layers).

Semaphore receptacle 112 can represent a location (e.g., a predetermined location, a dynamic location that is a user-definable or automatically moves with respect to the user, etc.) within environment 100 where semaphores can be stored until they are assigned to a user and/or to where the semaphores return when not assigned to the user(s). In some examples, when a semaphore is assigned to a user, the semaphore is relocated from its initial position within environment 100 to a different position within environment 100. In some examples, the semaphore is relocated from its initial position within environment 100 to a position within a threshold distance DTH of a visual representation of a user 102A, 102B, or 102N (e.g., the virtual representations of a particular user account being used to access or participate in environment 100 visually represented by an avatar, for example). In some examples, the visual representations of a user 102A, 102B, or 102N can have an anthropomorphized appearance (e.g., a human-shaped representation), but in other examples the visual representations of a user 102A, 102B, or 102N can be presented using any suitable representation within environment 100.

Object 104A is illustrated as including object layers 106A, 106B, and 106C, which represent any number of distinct object layers within object 104A, associated with different media layers, or data layers. As an example, object layer 106A can represent a text data layer (e.g., a canvas or processing tool for organizing text data input from users), object layer 106B can represent an audio data layer (e.g., speech narration, or background audio canvas optionally related to object layer 106A of object 104A), and object layer 106C can represent a visual data layer (e.g., at least one still or moving image canvas comprising pixels/voxels optionally related to object layer 106A or 106B of object 104A).

Object 104B is illustrated, similarly to object 104A, as including object layers 108A, 108B, and 108C, which represent any number of distinct object layers within the object, associated with different media layers or data layers. As described above in connection with the example object layers 106A-C of object 104A, object layers 108A-C of object 104B can be data or media layers of different types that are optionally related or interrelated. In some examples, a subset of object layers of an object can represent multiple distinct data or media layers of the same type. As an example, object layer 108A and object layer 108B can both be text data layers, audio data layers, or visual data layers associated with object 104B. In some examples, an object can have any number of object layers corresponding to any layer type (e.g., a text data layer, an audio data layer, a visual data layer, a modeling data layer, or a communication data layer), and can optionally including multiple layers of the same type.

In some examples, each of the objects (e.g., 104A, 104B. etc.) can have at least one associated semaphore receptacle 112 or 114. In some examples, a semaphore receptacle can be a location within environment 100 that one or more semaphores are initially displayed when the environment is first presented to one or more users, particularly in environments where there is no default or initial assignment of semaphores to users. Semaphore receptacles can also be presented in environment 100 such that each semaphore is either associated with a single particular object or is a common receptacle that can be associated with more than one particular object (e.g., not associated with only a single particular object). As an example, semaphore receptacle 112 can be associated with only object 104A, and can contain semaphores 120-1, 120-2, and 120-3 used for editing object layers of object 104A. In some examples, each of the semaphores 120-1, 120-2, and 120-3 are respectively associated with a corresponding object layer of object 104A (e.g., each of the semaphores is associated with a different, single, object layer of object 104A). Specifically, semaphores 120-1, 120-2, and 120 3, can respectively correspond with object layers 106A, 106B, and 106C of object 104A, and, when assigned to a particular user, confer write access privileges to the user, for only the object layer(s) corresponding to the assigned semaphores.

In some examples, because semaphore receptacle 112 is associated with object 104A, and no other objects, semaphore receptacle 112 is displayed as being directly adjacent to object 104A (e.g., visual representations of semaphore receptacle 112 and object 104A are within a threshold distance of and/or displayed adjacent to one another in environment 100). In some examples, a user 102A, 102B, or 102N can approach object 104 and request write access (or other related privileges) for the constituent object layers 106A, 106B, or 106C by interacting with semaphore receptacle 112 or the semaphores stored therein. In some examples, a user can interact with the semaphore receptacle 112 or the semaphores stored therein from a distance. In some examples, a user can interact with semaphore receptacle 112 or the semaphores stored therein to request assignment of semaphores 120-1, 120-2, and/or 120-3 to another user or to themselves (e.g., self-assigning, or summoning one or more semaphores). Similarly, a user can interact with semaphore receptacle 112 or the semaphore to relinquish a currently-assigned semaphore (e.g., returning the currently-assigned semaphore to semaphore receptacle 112 by de-assigning the semaphore from a user).

As another example, semaphore receptacle 114 can be associated with both object 104A and object 104B. Because semaphore receptacle 114 is not associated with only a single particular object, semaphore receptacle 114 can be located within environment 100 in an area that is near (e.g., within a second threshold distance of), both object 104A and object 104B (e.g., not directly adjacent to/not abutting object 104A or object 104B). In some examples, as illustrated in FIG. 1, semaphore receptacle 114 is nearer to object 104B than object 104A because object 104A has semaphore receptacle 112 presented directly adjacent to object 104A. In some examples, semaphore receptacle 114 can be displayed at a location equidistant between object 104A and object 104B.

In some examples, semaphores shown within semaphore receptacle 114 can be associated with object 104A and/or object 104B. As an example, semaphore receptacle 114 can contain each of the semaphores 122-1, 122-2, and 122-3, which are respectively associated with a corresponding object layer (or type of object layers) of object 104A and/or 104B. A user 102A, 102B, or 102N can request write access (or other related privileges) for the constituent object layers 106A and 108A, 106B and 108B, and/or 106C and 108C by interacting with semaphore receptacle 114 or the semaphores therein. In particular, a user can interact with semaphore receptacle 112 to request assignment of semaphores 122-1, 122-2, and/or 122-3 to another user or to user (e.g., self-assigning or summoning one or more semaphores). Similarly, a user can interact with semaphore receptacle 114 or relinquish a currently-assigned semaphore (e.g., returning the currently-assigned semaphore to semaphore receptacle 114 by de-assigning the semaphore from a user).

In some examples, assignment of a semaphore to a user 102A, 102B, or 102N can confer write access privileges to an object presented within environment 100, or its particular constituent object layers (e.g., privileges to edit, update a state of, or otherwise contribute changes to the object or object layers). In some examples, when a semaphore is assigned to a user, the semaphore is relocated from a first position within environment 100 to a second position within a threshold distance DTH of a visual representation of a user 102A, 102B, or 102N. As shown in FIG. 1, for example, a first (e.g., initial/default) position for semaphores 120-1, 120-2, and 120-3 can be within semaphore receptacle 112, and a first (e.g., initial/default) position for semaphores 122-1, 122-2, and 122-3 is within semaphore receptacle 114. However, in some examples, semaphores 120-1, 120-2, 120-3, 122-1, 122-2, and 122-3 are initially assigned to one or more users (e.g., according to some schedule, or other rule-based semaphore assignment scheme associated with initialization of environment 100).

In some examples, the semaphore can remain stationary, but the appearance of the semaphore and the assigned user can change. For example, when a semaphore is assigned to a user, the semaphore can appear relatively faded (e.g., presented with low contrast, brightness, or other visual characteristic levels) and the user can appear relatively emphasized (e.g., presented with high contrast, brightness, or other visual characteristic levels relative to other users/objects in the environment).

In some examples, an object can have one or more layers that are related such that assignment of one semaphore to a particular user confers write access privileges to the particular user in connection with all constituent object layers within the object. In some other examples, one or more objects can be related such that assignment of one semaphore to a particular user confers write access privileges to the particular user in connection with all constituent object layers within multiple related objects corresponding to the semaphore.

In some examples, first and second layers of an object can be related by virtue of both being the same layer type (relation by layer type), or being different layer types relating to a common theme/aspect of the object (relation by context). However, layers of the object can be grouped by any other relation, without the content of any layer necessarily being dependent on any other layer. In some examples, a semaphore can confer write access privileges to a user for related layers (e.g., grouped by layer type or context), but not conferring write access privileges to the user for unrelated layers. As an example, one of the semaphores associated with object 104A can correspond to a particular layer type relationship (e.g., a text layer); any user, upon assignment of this semaphore, can be granted write access privileges to all constituent layers of the particular layer type of object 104A (e.g., other text layers of object 104A). As another example, one of the semaphores associated with both object 104A and object 104B can correspond to a particular layer context relationship; any user, upon assignment of this semaphore, can be granted write access privileges to all constituent layers associated with the particular layer context of both object 104A and 104B (e.g., multiple layers of object 104A and 104B that relate to visual specifications of those objects can be edited by a single semaphore).

As described herein, in some examples, users in environment 100 can be assigned a semaphore (or multiple semaphores) according to a schedule, according to requests for assignments (e.g., a request from the user or from another user), or according to a combination of a schedule and requests for assignments. In examples where semaphores are assigned to users based at least in part on a schedule, a system can be configured to assign semaphores to users based on at least one metric relating to user participation rates, or any other relevant statistic, metric, scheme for automatically assigning semaphores to users (e.g., making semaphore assignments to users to ensure that all users in the environment have participation rates proportional to their time within environment 100). In some examples, the system can include a scheduling engine (e.g., hardware, firmware, and/or software) configured to assign the semaphore(s) to particular users and particular times. Additionally or alternatively, semaphore assignment can proceed according to user requests. In some examples, a user can make a selection (e.g., selecting a graphical menu option that represents a request to change a semaphore assignment) that the system can fulfill after selection, as described herein.

Some example user-semaphore selections 130 are illustrated as selectable icons that are presented in environment 100 (e.g., contained within a semi-circular dashed region). In some examples, such as the illustrations of FIGS. 3A and 3B, user-semaphore selections similar to 130 of FIG. 1 are illustrated as being located directly adjacent to (e.g., abutting) or as part of the semaphore receptacles (e.g., as options 308A, 308B, and 308C). In other words, selections 130 can be presented directly adjacent to (e.g., abutting) or as part of semaphore receptacles 112 and 114, rather than the exemplary free-floating presentation shown in FIG. 1. User-semaphore selections 130 can optionally include a selection to summon 132, a selection to relinquish or surrender 134, a selection to transfer 136, and a selection to schedule 138. Although FIG. 1 includes a graphical user interface for selections 130, these inputs can be provided by the user without making selections on a graphical user interface rendered within the environment. For example, the selections can be gesture based, as described herein.

In some examples, a user within environment 100 can provide an input that computing resources hosting the environment (discussed in greater detail below, in connection with FIG. 2) recognize as corresponding to an action invoking selection to summon 132 a semaphore. In some examples, a summon action can include a selection of a menu option (e.g., a user interface element for selection to summon 132 a semaphore as illustrated in FIG. 1). Additionally or alternatively, the summon action can include a performance of a gesture (e.g., a gesture corresponding to selection to summon 132). In some examples, after invoking selection to summon 132, a user can be prompted to specify a particular semaphore (or multiple semaphores) to summon. Alternatively, each selectable instance of selection to summon 132 presented within environment 100 can be respectively associated with a unique semaphore (e.g., a 1-to-1 correspondence between selection to summon 132 and its associated semaphore). In some examples, when user input for invoking selection to summon 132 the semaphore includes a gesture to summon the semaphore, the gesture to summon the semaphore can be associated with a particular semaphore by direct interaction (e.g., touching, grabbing, or picking up the semaphore) or indirect interaction (e.g., using gaze or a pointing input device to target the particular semaphore to summon). The selection can cause a semaphore associated with selection to summon 132 the semaphore to be assigned to the user who invoked the selection.

In some examples, the summoning can first require satisfying one or more criteria (e.g., attributes of any users currently assigned the semaphore, a priority of the user requesting the semaphore, conditions/intervals prescribed by a semaphore schedule, etc.). A semaphore is assigned to a user who requested to summon the semaphore in accordance with a determination that the one or more criteria are satisfied. In such examples, the semaphore is not assigned to the user (e.g., forgo assignment) in accordance with a determination that the one or more criteria are not satisfied (e.g., not resulting in any change to the current assignment status of the semaphore). Additional discussion of example criteria to evaluate before fulfilling a user's request to summon a semaphore in response to a user invoking selection to summon 132 are included below.

In some examples, a user within environment 100 can provide an input that computing resources hosting the environment recognize as corresponding to an action invoking selection to surrender 134. In some examples, a surrender action (also referred to as relinquish action) can include a selection of a menu option (e.g., a user interface element for selection to surrender 134 a semaphore as illustrated in FIG. 1). Additionally or alternatively, the surrender action can include a performance of a gesture (e.g., a gesture corresponding to selection to surrender 134). In some examples, after invoking selection to surrender 134, a user can be prompted to specify a particular semaphore to surrender (e.g., if the user is currently-assigned more than one semaphore). Alternatively, each selectable instance of selection to surrender 134 presented within environment 100 can be respectively associated with a unique semaphore (e.g., a 1-to-1 correspondence between selection to surrender 134 and its associated semaphore). In some examples, when user input for invoking selection to surrender 134 the semaphore includes a gesture to surrender the semaphore, the gesture to surrender the semaphore can be associated with a particular semaphore by direct interaction (e.g., releasing, dropping, or placing down) or indirect interaction (e.g., using gaze or a pointing input device to target the particular semaphore to surrender). The selection to surrender can cause a semaphore associated with selection to surrender 134 to be surrendered by (e.g., relinquished by or de-assigned from) the user who invoked the selection. In some examples, when a user successfully surrenders a semaphore, the semaphore can be de-assigned from the user and re-assigned to another entity (e.g., another user) or returned to a semaphore receptacle.

In some examples, the surrendering can first require satisfying one or more criteria (e.g., attributes of the user currently assigned the semaphore, conditions/intervals prescribed by a semaphore schedule, priorities of other users who are scheduled to be assigned the semaphore, etc.). A semaphore is surrendered in accordance with a determination that the one or more criteria are satisfied. In such examples, the semaphore is not surrendered by the user (e.g., forego de-assignment of the semaphore from the user requesting the surrender) in accordance with a determination that the one or more criteria are not satisfied (e.g., not resulting in any change to the current assignment status of the semaphore). Additional discussion of example criteria to evaluate before fulfilling a user's request to surrender a semaphore in response to a user invoking selection to surrender 134 are included below.

In some examples, a user within environment 100 can provide an input, that computing resources hosting environment recognizes as corresponding to an action invoking selection to transfer 136 a semaphore. In some examples, a transfer action can include a selection of a menu option (e.g., a user interface element for selection to transfer 136 a semaphore as illustrated in FIG. 1). Additionally or alternatively, the transfer action or can include a performance of a gesture (e.g., a gesture corresponding to selection to transfer 136). In some examples, after invoking selection to transfer 136, a user can be prompted to specify a particular semaphore to transfer (e.g., if the user is currently-assigned more than one semaphore). Alternatively, each selectable instance of selection to transfer 136 presented within environment 100 can be respectively associated with a unique semaphore (e.g., a 1-to-1 correspondence between selection to transfer 136 and its associated semaphore). In some examples, when user input for invoking selection to transfer 136 the semaphore includes a gesture to transfer, the gesture to transfer the semaphore can be associated with a particular semaphore using directed or indirect interaction. Additionally, user input for invoking selection to transfer 136 can include a specification of the other user who the semaphore should be transferred to. The selection can cause a semaphore associated with selection to transfer 136 to be transferred from or de-assigned from the user who invoked the selection and re-assigned to another entity (e.g., another user, specified through user selection of user interface elements or a user gesture, etc.).

In some examples, the transferring can first require satisfying one or more criteria (e.g., attributes of the user currently assigned the semaphore, a priority of the user proposed to receive the semaphore through transfer, conditions/intervals prescribed by a semaphore schedule, priorities of other users who are scheduled to be assigned the semaphore, etc.). A semaphore is transferred to another user in accordance with a determination that the one or more criteria are satisfied. In some such examples, the semaphore is not transferred from the user to another user (e.g., forego de-assignment of the semaphore from the user requesting the transfer and forego re-assignment of the semaphore to another user) in accordance with a determination that the one or more criteria are not satisfied. Additional discussion of example criteria to evaluate before fulfilling a user's request to transfer a semaphore, in response to a user invoking selection to transfer 136 are included below.

In some examples, a user within environment 100 can provide an input that computing resources hosting the environment recognize as corresponding to an action invoking selection to schedule 138. In some examples, a schedule action can include a selection of a menu option (e.g., a user interface element for selection to schedule 138 as illustrated in FIG. 1). Additionally or alternatively, the schedule action can include a performance of a gesture (e.g., a gesture corresponding to selection to schedule 138). After invoking selection to schedule 138, a user can be prompted to specify a particular semaphore to schedule for future assignment (e.g., if the semaphore is assigned to another user), a future point in time when the assignment should be made, and/or a particular user to assign the particular semaphore to in the future (e.g., self-assignment or assignment to another user). Alternatively, each selectable instance of selection to schedule 138 presented within environment 100 can be respectively associated with a unique semaphore (e.g., a 1-to-1 correspondence between selection to schedule 138 and its associated semaphore), a future point in time, and/or a particular user to schedule the semaphore assignment for. In some examples, when user input for invoking selection to schedule 138 includes a gesture to schedule a semaphore assignment in the future, the gesture to schedule can be associated with a particular semaphore using direct or indirect interaction. Additionally, user input for invoking selection to schedule 138 can include a specification of the user who the semaphore should be assigned to in the future (e.g., specifying scheduled self-assignment or scheduled assignment to another user). Additionally, user input for invoking selection to schedule 138 can include a specification of the time in the future when the semaphore should be assigned to another user (e.g., specifying a future time for the scheduled transfer of assignment). In this way, selection to schedule 138 allows for a user to effectively create or modify a semaphore assignment schedule by requesting to schedule a transfer of a particular semaphore, at a particular time in the future, to a particular user (e.g., the requesting user, or any other user) from within environment 100. The selection can cause a semaphore associated with selection to schedule 138 to be de-assigned from any user assigned the semaphore at the time in the future and re-assigned to another entity (usually another user specified through the schedule) at a future time.

In some examples, the scheduling can first require satisfying one or more criteria (e.g., attributes of the user currently assigned the semaphore, a priority of the user proposed to receive the semaphore through the scheduled transfer, conditions/intervals prescribed by a semaphore schedule, priorities of other users who are scheduled to be assigned the semaphore, etc.). A semaphore is scheduled to transfer to another user in accordance with a determination that the one or more criteria are satisfied. In some such examples, the semaphore is not transferred from a user to another user in accordance with the schedule (e.g., forego de-assignment of the semaphore from a user and forego re-assignment of the semaphore to another user) in accordance with a determination that the one or more criteria are not satisfied (e.g., not resulting in any change to a scheduled future assignment status of the semaphore). Additional discussion of example criteria to evaluate before fulfilling a user's request to schedule a transfer of semaphore assignment in response to a user invoking selection to schedule 138 are included below.

As described above, computing resources hosting the environment can selectively fulfill requests based on user-semaphore selections 130. In particular, computing resources hosting environment 100 can determine whether one or more criteria are fulfilled/satisfied, before fulfilling user requests relating to semaphore assignment (e.g., before enacting any semaphore summon, surrender, transfer, or scheduled transfer requests in response to any invocation of user-semaphore selections 130). These criteria can be based on a user's priority, attributes of a user, historical durations of semaphore assignment for a user, historical participation rates of a user, existing/outstanding requests for scheduled transfers of semaphores to users, or a pre-existing schedule for semaphore assignments. In some examples, the criteria for fulfilling user requests relating to semaphore assignment can include at least one criterion that relates to a single user (e.g., the requesting user who invoked user-semaphore selections 130, or a user specified as a semaphore recipient in a particular request). In some examples, the criteria for fulfilling user requests relating to semaphore assignment can include at least one criterion that relates to more than one user (e.g., a comparison between users, an evaluation of one user relative to another user according to a metric, or a comparison of one user to remaining users). Upon receiving a request associated with any of the user-semaphore selections 130, computing resources hosting environment 100 can fulfill the request in accordance with a determination that one or more criteria are fulfilled, and can forego fulfilling the request in accordance with a determination that the one or more criteria are not fulfilled. In some examples, computing resources hosting environment 100 can notify a user who requests a user-semaphore assignment, re-assignment, or surrender, when his/her request is foregone (e.g., due to the one or more criteria associated with the request not being satisfied). In some examples, computing resources hosting environment 100 can notify a user who requests a user-semaphore assignment, re-assignment, or surrender, when his/her request is fulfilled (e.g., by a visual indication/notification, change in location or visual attribute of the semaphore specified in the request, or any other suitable means for communicating the satisfaction of the one or more criteria required to fulfill the request).

Figure 2:
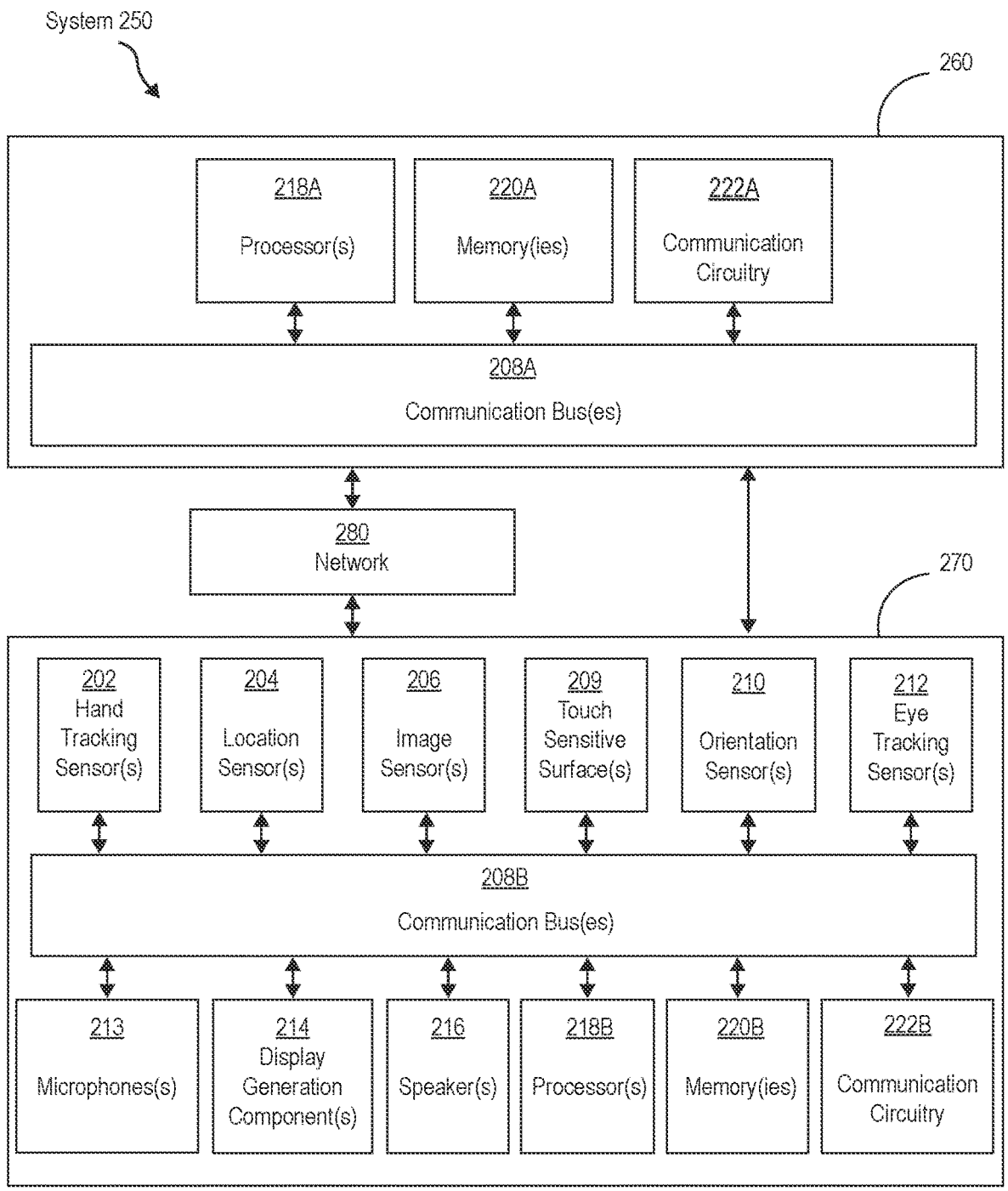
FIG. 2 illustrates an exemplary configuration of user computing resources and environment presentation resources, represented as separate devices, according to examples of the disclosure.

FIG. 2 illustrates an exemplary configuration of user computing resources and environment hosting resources, represented as separate devices, according to examples of the disclosure. Example block diagrams of architectures for a system or device described in connection with FIG. 2 are meant to be illustrative, and should not limit the scope of the present disclosure. For example, the device/system can include fewer, additional, or other components in the same or different configurations. In some examples (not illustrated), components and/or functionalities of system/device 250 can be divided between additional devices, or fewer devices (e.g., a single device can contain all the components, and perform all the functions of system/device 250). For example, a first device 260 optionally includes processor(s) 218A, memory or memories 220A, and communication circuitry 222A, optionally communicating over communication bus(es) 208A.

In some examples, first device 260 can be referred to as an "environment hosting resource," or "remote/server computing resources" representing computing resources that are remote (e.g., relative to a user of system 250). In some examples, first device 260 is a server, application-specific computing device, or any other suitable computing resource for hosting, presenting, and maintaining a multi-user collaborative environment (e.g., environment 100). In some examples, the processor(s) 218A, memory 220A, and communication circuitry 222A of first device 260 can perform the processes, steps, or methods of maintaining current/historical records of semaphore usage (e.g., on a per-semaphore basis, on a per-user basis, etc.), resolving requests for user-semaphore assignments or user-semaphore de-assignments (e.g., based on user selections from the selections 132, 134, 136, and/or 138 of user-semaphore selections 130), and/or applying or enforcing a semaphore assignment schedule (e.g., in examples where user-semaphore assignments within a multi-user collaborative environment are based at least in part on a schedule). In some examples, the aforementioned operations performed by first device 260 is performed by the processor(s) 218A, using memory 220A to store and retrieve data structures required to perform the operations, and communicating intermediate/final results from the operations via communication circuitry 222A.

Processor(s) 218A optionally include one or more general purpose processors, one or more graphics processors, and/or one or more digital signal processors (DSPs). In some examples, memory 220A is a non-transitory computer-readable storage medium (e.g., flash memory, random access memory, or other volatile or non-volatile memory or storage) that stores computer-readable instructions (e.g., programs) configured to be executed by processor(s) 218A to perform the techniques, processes, and/or methods described below. In some examples, the processes performed by processor 218A can include: maintaining current/historical records of semaphore usage, resolving requests for user-semaphore assignments or user-semaphore de-assignments, and/or applying or enforcing a semaphore assignment schedule. Optionally, in certain examples, the processes performed by processor 218A can additionally include: maintaining a repository of the data structures/objects made available to users within a multi-user collaborative environment (e.g., environment 100), maintaining a record of any/all changes within the environment (e.g., position changes of visual representations of users within the environment, changes to user-semaphore assignments, etc.), and/or graphically rendering the environment (e.g., and communicating the rendered environment to another device(s) via communication circuitry 222A).

In some examples, memories 220A include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. In addition to storing computer-executable instructions for use by processor 218A, memory 220A can be used to store data structures required by processor 218A to perform the processes mentioned above. In some examples, data structures stored by memory 220A include a user-semaphore ledger (e.g., a data structure that maintains current/historical records of user-semaphore assignments on a per-user, or per-semaphore basis), collision prevention/avoidance rules (e.g., a data structure that maintains priority attributes of users within an environment, that can be used to resolve competing user requests for a semaphore assignment), a semaphore schedule (e.g., a sequence, or any other scheme, for assigning any particular semaphore to more than one user over a period of time), an object repository (e.g., containing and maintaining changes to objects displayed in the environment), and/or an environment changelog (e.g., a list of changes to the environment including changes to the positions of visual representations of a user, user-semaphore assignments, or any other representable changes to the state of the environment).

Communication circuitry 222A optionally includes circuitry for communicating with electronic devices, networks, such as the Internet, intranets, a wired network and/or a wireless network, cellular networks, and wireless local area networks (LANs). Communication circuitry 222A optionally includes circuitry for communicating using near-field communication (NFC) and/or short-range communication, such as Bluetooth®. In some examples, communication circuitry 222A is used to transmit information about a multi-user collaborative environment (e.g., environment 100) to second device 270 (e.g., a user's computing resources, such as a phone, tablet, head-mounted display, etc.). As a particular example, communication circuitry 222A can maintain an environment changelog (e.g., at memory 220A), that is periodically transmitted to one or more devices, that can be similar to second device 270. As another example, communication circuitry 222A can stream rendered images of a multi-user collaborative environment to one or more devices, that can be similar to second devices 270 (e.g., phone(s), tablet(s), head-mounted display(s), etc.). In some examples, communication circuitry 222A receives information corresponding to user input from another electronic device (e.g., second device 270), and can cause one or more data structures of memory 220A to be updated in response to receiving the information corresponding to user input. As an example, communication circuitry 222A may receive information corresponding to a user request for a change to the current user-semaphore assignments within the multi-user collaborative environment. In response to receiving the user request, communication circuitry 222A may forward the request to processor 218A (which can fulfill/deny the request, and update a user-semaphore ledger stored in memory 220A accordingly). As another example, communication circuitry 222A may receive information corresponding to user input that changes a position of a visual representation of one of the users 102A, 102B, or 102N within environment 100. As yet another example, communication circuitry 222A may receive information corresponding to user input that corresponds to a gesture of a user detected by the user's computing resources (e.g., second devices 270).

A second device 270 optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display generation component(s) 214, one or more speaker(s) 216, one or more processor(s) 218B, one or more memories 220B, and/or communication circuitry 222B. One or more communication buses 208B are optionally used for communication between the above-mentioned components of device 270. In some examples, second device 270 can be referred to as a "user computing resource," representing computing resources by which a user accesses a multi-user collaborative environment (e.g., environment 100 of FIG. 1) and interacts with the environment (e.g., requesting/relinquishing semaphores, making changes to objects within the environment, traversing the environment using a virtual representation, etc.). In some examples, device 270 is a portable device, such as a mobile phone, smart phone, a tablet computer, a laptop computer, an auxiliary device in communication with another device, etc. In some examples, device 270 is a wearable electronic device, such as a head-mounted device that renders the multi-user collaborative environment on a display (e.g., display generation component 214) that is mounted at a fixed position relative to a user's eyes/head. First device 260 and second device 270 optionally communicate via a wired or wireless connection (e.g., via communication circuitry 222A-222B) between the two devices (indicated by the bi-directional line between devices 260 and 270). In some examples, communication circuitry of the first device 260 and second device 270 optionally exchange information via a communication channel that is routed through network 280 (e.g., a local area network, the Internet, etc.).

A computer-generated environment (e.g., environment 100) may be displayed using an electronic device (e.g., electronic device 270), including using one or more display generation components. The computer-generated environment can optionally include various graphics user interfaces ("GUIs") that can be displayed using a display generation component of the electronic device, and that can receive user input using one or more input devices of the electronic device, and (optionally) one or more cameras of the electronic device.

Processor(s) 218B optionally include one or more general purpose processors, one or more graphics processors, and/or one or more digital signal processors (DSPs). In some examples, memory 220B is a non-transitory computer-readable storage medium (e.g., flash memory, random access memory, or other volatile or non-volatile memory or storage) that stores computer-readable instructions configured to be executed by processor(s) 218B to perform the techniques, processes, and/or methods described below. In some examples, the processes performed by processor 218B can include: detecting user input corresponding to user gestures or selections based on information/readings from hand tracking sensors 202, image sensors 206, eye tracking sensors 212, and/or any other component(s) coupled to communication bus 208B. Processor 218B can also detect user input corresponding to modifications or edits to objects presented within the multi-user collaborative environment. Processor 218B can also determine and record statistics about the user within the multi-user collaborative environment (e.g., participation levels, activity levels, duration of semaphore assignments, etc.).

In some examples, memories 220B include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. In addition to storing computer-executable instructions for use by processor 218B, memory 220B can be used to store data structures required by processor 218B to perform the processes mentioned above. In some examples, data structures stored by memory 220B include a table for storing statistics about a particular user, or multiple users (e.g., a user statistics table that includes directly measured, and derived/inferred measures of any particular user's activity within a multi-user collaborative environment). In some examples, data structures stored by memory 220B include data corresponding to gesture inputs provided by the user (e.g., reference data to which user input data is compared, for determining when user input is associated with a gesture input being performed by the user). In some examples, data structures stored by memory 220B include copies of objects represented or rendered within the multi-user collaborative environment (e.g., a mirror version of an object repository stored at memory 220A of first device 260, from which any changes are periodically sent to, or reconciled with, the object repository on first device 260).

Communication circuitry 222B optionally includes circuitry for communicating with electronic devices, networks, such as the Internet, intranets, a wired network and/or a wireless network, cellular networks, and wireless local area networks (LANs). Communication circuitry 222B optionally includes circuitry for communicating using near-field communication (NFC) and/or short-range communication, such as Bluetooth®. In some examples, processor 218A renders the multi-user collaborative environment from the vantage of a particular one of the users, and communication circuitry 222B conveys the rendered environment to the particular user. In other examples, processor 218A provides details necessary to accurately render the multi-user collaborative environment from the vantage of a particular one of the users, to the computing resources (e.g., second device 270) of the particular user (e.g., to enable the computing resources of the particular user to render the environment locally).

Display generation component(s) 214 optionally include a single display (e.g., a liquid-crystal display (LCD), organic light-emitting diode (OLED), or other types of display). In some examples, display generation component(s) 214 include multiple displays. In some examples, display generation component(s) 214 includes a display with a touch-sensitive surface (e.g., a touch screen), a projector, a holographic projector, a retinal projector, etc. In some examples, such as when second device 270 is a head-mounted device, display generation component(s) 214 can be positioned within device 270 such that, when device 270 is worn, display generation component(s) 214 are located at a fixed or adjustable distance from the eyes of a user. In some examples, display generation component(s) 214 are primarily used to render/present a three-dimensional visualization of a multi-user collaborative environment to a user. As described in connection with FIG. 1, the environment displayed by display generation component(s) 214 can include multiple visual representations of users 102A, 102B, and/or 102N, as well as visual representations of (multi-layer) editable objects, semaphores to obtain write access privileges with respect to the editable objects, and/or semaphore receptacles. In addition to these features of environment 100, display generation component(s) can render an overall scene/location (e.g., a scenic setting, a classroom setting, etc.) within which the aforementioned features/elements of the environment 100 are placed or located.

In some examples, device 270 includes touch-sensitive surface(s) 209 configured to receive user inputs (touch and/or proximity inputs), such as tap inputs and swipe inputs or other gestures. In some examples, display generation component(s) 214 and touch-sensitive surface(s) 209 together form touch-sensitive display(s) (e.g., a touch screen integrated with device 270 or external to device 270 that is in communication with device 270).

Image sensors(s) 206 optionally include one or more visible light image sensor, such as charged coupled device (CCD) sensors, and/or complementary metal-oxide-semiconductor (CMOS) sensors operable to obtain images of physical objects from the real-world environment. Image sensor(s) 206 optionally include one or more infrared (IR) or near IR sensors, such as a passive or an active IR or near IR sensor, for detecting infrared or near infrared light from the real-world environment. For example, an active IR sensor includes an IR emitter for emitting infrared light into the real-world environment. Image sensor(s) 206 optionally include one or more cameras configured to capture movement of physical objects in the real-world environment. Image sensor(s) 206 optionally include one or more depth sensors configured to detect the distance of physical objects from device 270. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, device 270 uses CCD sensors and depth sensors in combination to detect the physical environment around device 270. In some examples, image sensor(s) 206 include a first image sensor and a second image sensor. The first image sensor and the second image sensor work together and are optionally configured to capture different information of physical objects in the real-world environment. In some examples, the first image sensor is a visible light image sensor, and the second image sensor is a depth sensor. In some examples, device 270 uses image sensor(s) 206 to detect the position and orientation of device 270 and/or display generation component(s) 214 in the real-world environment. For example, device 270 uses image sensor(s) 206 to track the position and orientation of display generation component(s) 214 relative to one or more fixed objects in the real-world environment.

In some examples, device 270 optionally includes hand tracking sensor(s) 202 and/or eye tracking sensor(s) 212. Hand tracking sensor(s) 202 are configured to track the position/location of a user's hands and/or fingers, and/or motions of the user's hands and/or fingers with respect to the computer-generated environment, relative to the display generation component(s) 214, and/or relative to another coordinate system. Eye tracking sensor(s) 212 are configured to track the position and movement of a user's gaze (eyes, face, and/or head, more generally) with respect to the real-world or computer-generated environment and/or relative to the display generation component(s) 214. In some examples, hand tracking sensor(s) 202 and/or eye tracking sensor(s) 212 are implemented together with the display generation component(s) 214 (e.g., in the same device). In some examples, the hand tracking sensor(s) 202 and/or eye tracking sensor(s) 212 are implemented separate from the display generation component(s) 214 (e.g., in a different device).

In some examples, the hand tracking sensor(s) 202 uses image sensor(s) 206 (e.g., one or more IR cameras, three-dimensional cameras, depth cameras, etc.) that capture three-dimensional information from the real-world including one or more hands. In some examples, the hands can be resolved with sufficient resolution to distinguish fingers and their respective positions. In some examples, one or more image sensor(s) 206 are positioned relative to the user to define a field of view of the image sensor(s) and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures) can be advantageous in that it provides an input means that does not require the user to touch or hold input device, and using image sensors allows for tracking without requiring the user to wear a beacon or sensor, etc. on the hands/fingers.

In some examples, eye tracking sensor(s) 212 includes one or more eye tracking cameras (e.g., IR cameras) and/or illumination sources (e.g., IR light sources/LEDs) that emit light towards a user's eyes. Eye tracking cameras may be pointed towards a user's eyes to receive reflected light from the light sources directly or indirectly from the eyes. In some examples, both eyes are tracked separately by respective eye tracking cameras and illumination sources, and a gaze can be determined from tracking both eyes. In some examples, one eye (e.g., a dominant eye) is tracked by a respective eye tracking camera/illumination source(s).

Device 270 optionally includes microphones(s) 213 or other audio sensors. Device 270 uses microphone(s) 213 to detect sound from the user and/or the real-world environment of the user. In some examples, microphone(s) 213 includes an array of microphones that optionally operate together (e.g., to identify ambient noise or to locate the source of sound in space of the real-world environment).

Device 270 optionally includes location sensor(s) 204 configured to detect a location of device 270 and/or of display generation component(s) 214. For example, location sensor(s) 204 optionally includes a GPS receiver that receives data from one or more satellites and allows device 270 to determine the device's absolute position in the physical world.

Device 270 optionally includes motion and/or orientation sensor(s) 210 configured to detect orientation and/or movement of device 270 and/or display generation component(s) 214. For example, device 270 uses orientation sensor(s) 210 to track changes in the position and/or orientation of device 270 and/or display generation component(s) 214 (e.g., with respect to physical objects in the real-world environment). Orientation sensor(s) 210 optionally include one or more gyroscopes, one or more accelerometers, and/or one or more inertial measurement units (IMUs).

It is understood that the architecture of FIG. 2 is an example architecture, but that system/device 270 is not limited to the components and configuration of FIG. 2.

Figure 3A:
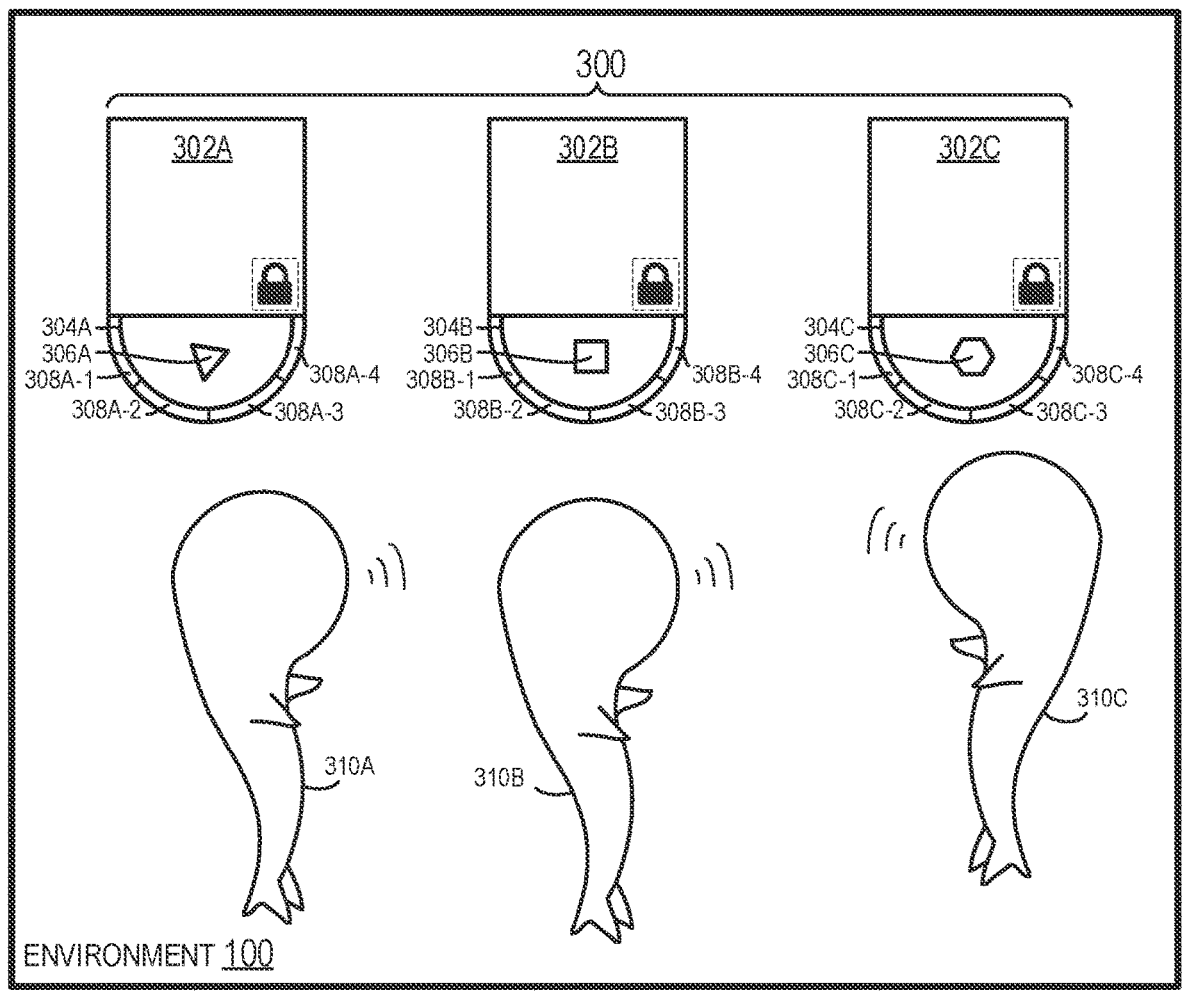
FIG. 3A illustrates an exemplary environment with receptacle-integrated icons for user-semaphore selections according to examples of the disclosure.

As described herein, one or more semaphores presented in an environment. FIG. 3A illustrates an exemplary environment with receptacle-integrated icons for user-semaphore selections according to examples of the disclosure. In particular, FIG. 3A illustrates an environment 100 containing a representation of a single object 300 with its constituent object layers 302A, 302B, and 302C represented separately (e.g., as opposed to the fanned/stacked representation of FIG. 1). Semaphore receptacles 304A, 304B, and 304C, respectively associated with the object layers 302A, 302B, and 302C, are also presented in environment 100 of FIG. 3A, but are unassigned to any of the users participating in the environment. Semaphores that confer write access privileges for certain object layers to the user are located within each of the semaphore receptacles 304A, 304B, and 304C. Specifically, a triangle-shaped semaphore 306A can be located within semaphore receptacle 304A, and can confer write access privileges for object layer 302A of object 300 to a user. Semaphore receptacle 304A and semaphore 306A can sometimes be referred to as "associated with" object layer 302A for this reason. A square-shaped semaphore 306B can be located within semaphore receptacle 304B, and can confer write access privileges for object layer 302B of object 300 to a user. Semaphore receptacle 304B and semaphore 306B can sometimes be referred to as "associated with" object layer 302B for this reason. A hexagon-shaped semaphore 306C can be located within semaphore receptacle 304C, and can confer write access privileges for object layer 302C of object 300 to a user. Semaphore receptacle 304C and semaphore 306C can sometimes be referred to as "associated with" object layer 302C for this reason. The shapes of semaphores 306A, 306B, and 306C are merely illustrative; it should be understood that these shapes do not limit the scope of all possible semaphore representations within an environment. In some examples, semaphores 306A, 306B, and 306C can have non-polygonal representations, such as 3-dimensional objects, or 2-dimensional representations of complex shapes corresponding to 3-dimensional objects. Some additional examples of semaphore shapes are illustrated and described in connection with FIG. 11.

In some examples, the shape of a semaphore can correspond in some way to the context or content of an object layer that it confers write access privileges for. As an example, a semaphore that confers write access privileges for an object layer containing text content can have the shape (2-dimensional, or 3-dimensional) of a pencil, a pen, a quill, a typewriter, and/or any other shape with an association to editing text. In some examples, the location of a semaphore can default to an initial position within a semaphore receptacle, as illustrated in FIG. 3A (e.g., when environment 100 is instantiated, or when an initial user or host user enters environment 100 for the first time). When a semaphore is located within a semaphore receptacle, it can visually indicate to any users within the environment that no user has been granted write access privileges to the object layer(s) that the semaphore and/or its receptacle are associated with. In some such examples, where no user has been granted write access privileges to an object layer, a visual representation of the object layer can be modified to include an indication that no changes can be made to the object layer (e.g., a graphically superimposed "lock" icon as illustrated in FIG. 3A, or any other suitable change to the visual representation of the object layer within the environment).

Figure 3B:
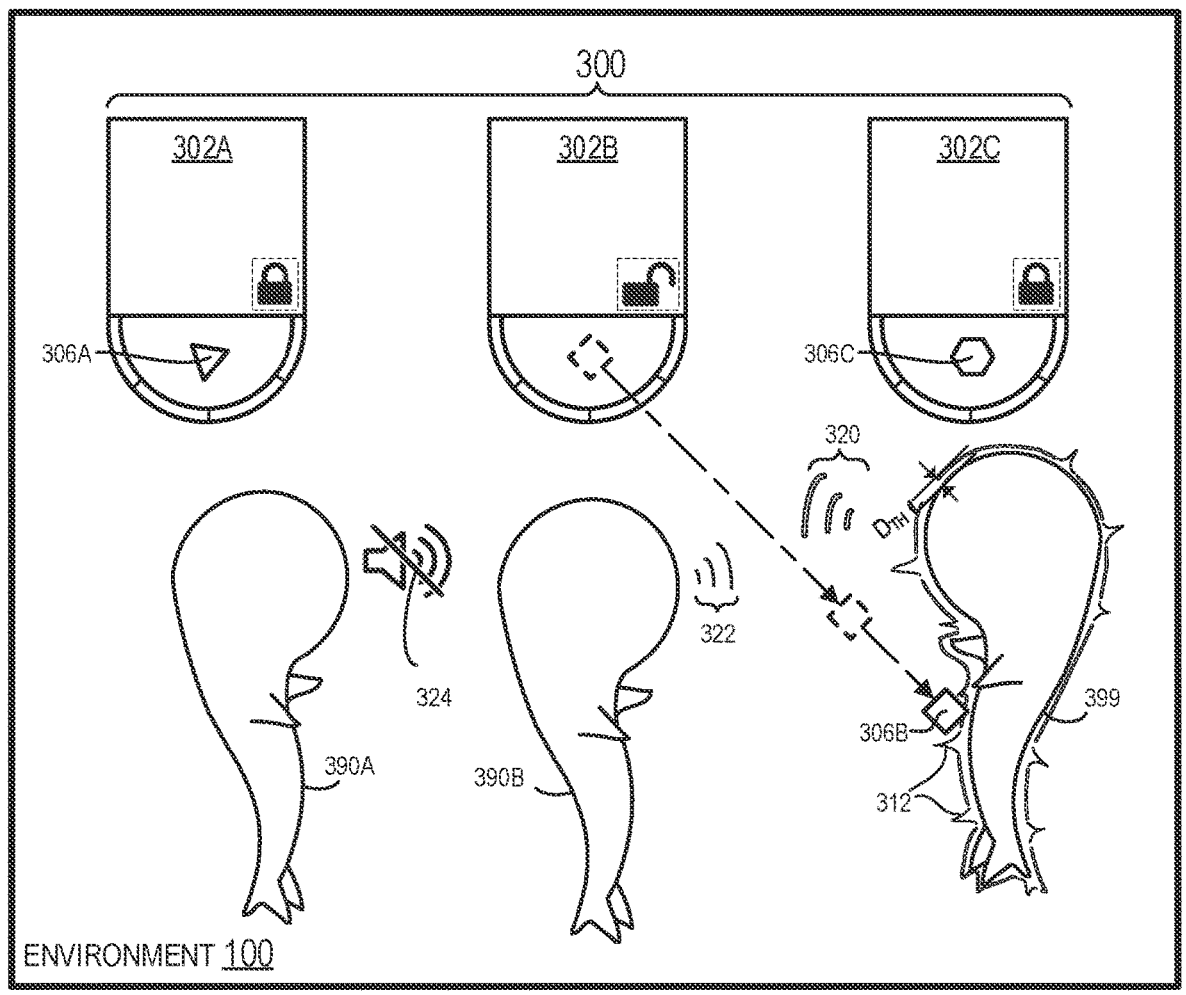
FIG. 3B illustrates an exemplary environment illustrating changes within the environment resulting from assignment of a semaphore according to examples of the disclosure.

Whereas FIG. 1 illustrated some example user-semaphore selections 130 as selectable icons presented in environment 100, without any particular association/proximity to any particular semaphore receptacles (e.g., as selections 130 that could apply to any/all semaphore receptacles in the environment), FIGS. 3A and 3B illustrate user-semaphore selections that are specific to a single semaphore or semaphore receptacle. As an example, user-semaphore selections 308A-1, 308A-2, 308A-3, and 308A-4 can correspond to, or be particularly associated with, semaphore receptacle 304A. Specifically, selection 308A-1 can correspond to a selection to summon (e.g., similar to selection 132 of FIG. 1, but specific to semaphore receptacle 304A and/or semaphore 306A within semaphore receptacle 304A), selection 308A-2 can correspond to a selection to relinquish or surrender (e.g., similar to selection 134 of FIG. 1, but specific to semaphore receptacle 304A and/or semaphore 306A within semaphore receptacle 304A), selection 308A-3 can correspond to a selection to transfer (e.g., similar to selection 136 of FIG. 1, but specific to semaphore receptacle 304A and/or semaphore 306A within semaphore receptacle 304A), and selection 308A-4 can correspond to a selection to schedule (e.g., similar to selection 138 of FIG. 1, but specifically associated with semaphore receptacle 304A and/or semaphore 306A within semaphore receptacle 304A). Similarly, user-semaphore selections 308B-1, 308B-2, 308B-3, and 308B-4 can respectively correspond to selections 132, 134, 136, and 138, described above in connection with FIG. 1 but specifically associated with semaphore receptacle 304B and semaphore 306B within semaphore receptacle 304B. Similarly, user-semaphore selections 308C-1, 308C-2, 308C-3, and 308C-4 can respectively correspond to selections 132, 134, 136, and 138, described above in connection with FIG. 1 but specifically associated with semaphore receptacle 304C and semaphore 306C within semaphore receptacle 304C.

User-semaphore selections specifically associated with particular semaphore receptacles and the semaphores located therein can be selected similarly to the selections 130 described above in connection with FIG. 1. In some examples, graphical user interface selections (e.g., the graphical representations of the user-semaphore selections in FIG. 3A) can be selectable by any of the users 310A, 310B, or 310C (e.g., by moving close to the selections within the environment, and invoking them user a suitable user input). In other examples, each of the selections can have a corresponding gesture that can be used to invoke the selection (e.g., without interacting with the graphical representations of the user-semaphore selections displayed within the environment). Specifically, a first gesture (e.g., any combination of hand and/or gaze movements, motions, or actions) can correspond to a selection to summon (e.g., equivalent to selecting the graphical representation of the selection), and can be used to invoke any one of selections 308A-1, 308B-1, or 308C-1. In some examples, a user can perform the first gesture while facing a desired semaphore receptacle within the environment (e.g., to disambiguate the selection intended by performing the first gesture). As an example, a user can perform the first gesture while facing (e.g., with their gaze, or pointing input device directed towards) semaphore receptacle 304A to invoke selection 308A-1, can perform the second gesture while facing semaphore receptacle 304B to invoke selection 308B-1, or can perform the second gesture while facing semaphore receptacle 304C to invoke selection 308C-1. These examples of invoking a user-semaphore selection relate to indirect interactions that a user can perform to invoke a selection associated with a semaphore receptacle, and can in some examples apply to selections 308A-2, 308B-2, or 308C-2 (e.g., when a user performs a second gesture, while respectively facing semaphore receptacle 304A, 304B, or 304C), selections 308A-3, 308B-3, or 308C-3 (e.g., when a user performs a third gesture, while respectively facing semaphore receptacle 304A, 304B, or 304C), and/or selections 308A-4, 308B-4, or 308C-4 (e.g., when a user performs a fourth gesture, while respectively facing semaphore receptacle 304A, 304B, or 304C).

User-semaphore selections can alternatively or additionally be invoked by direct interaction with a semaphore, regardless of whether the semaphore is located within a semaphore receptacle. As described above in connection with selection to summon 132 of FIG. 1, direct interaction gestures (that are equivalent to making a selection from the graphical user interface for selections 130 associated with a particular semaphore) can include touching, grabbing, or picking up a semaphore. In examples where the semaphore is located within a semaphore receptacle, a user 310A, 310B, or 310C can approach the semaphore receptacle, and perform a gesture (e.g., by performing actions using input devices, including the user's gaze and/or hands) corresponding to touching, grabbing, or picking up the semaphore within the receptacle, to request a summon (or, self-assignment) of the semaphore. In examples where the semaphore is located elsewhere within the environment (e.g., outside of a semaphore receptacle, or assigned to another user), a user 310A, 310B, or 310C can approach the location of the semaphore, and perform a gesture corresponding to touching, grabbing, or picking up the semaphore at the location within the environment, to request a summon (or, self-assignment) of the semaphore (e.g., thereby achieving a result equivalent to selecting a graphical user interface for selection 132, 308A-1, 308B-1, or 308C-1). Users 310A, 310B, or 310C can similarly perform a gesture corresponding to releasing, dropping, or placing down a semaphore that is assigned to themselves, to surrender a semaphore that is currently-assigned to the user (e.g., performing a gesture with relation to a semaphore that is already self-assigned, thereby achieving a result equivalent to selecting a graphical user interface for selection 134, 308A-2, 308B-2, or 308C-2). Users 310A, 310B, or 310C can similarly perform a gesture corresponding to moving or repositioning a semaphore, to transfer a semaphore that is assigned to a particular user to another user (e.g., thereby achieving a result equivalent to selecting a graphical user interface for selection 136, 308A-3, 308B-3, or 308C-3).

Notably, however, FIG. 3A illustrates semaphores 306A, 306B, and 306C that are all unassigned (e.g., no user-semaphore assignments have been requested, asserted, or otherwise formed within environment 100). As such, in some examples, each user 310A, 310B, and 310C is equally privileged within the environment 100, because none of the users is provided write access privileges (e.g., the privileges conferred by user-semaphore assignments). In some examples, each class of privileged users within environment 100 can be represented with common visual and auditory characteristics. As an example, because the three users 310A, 310B, and 310C of FIG. 3 all belong to the same class (e.g., of users without any write access privileges), all three users can be displayed within environment 100 using a shared/common visual characteristic (e.g., shared level of opacity for the visual representation of the users, shared absence of highlighting around the visual representation of the users, etc.). Similarly, as an example, all three users can have their audio inputs within environment 100 played/transmitted at a common volume level, as long as the three users remain within the same class of users (e.g., as long as the three users have equal access privileges to object layers 302A, 302B, or 302C of object 300).

FIG. 3B illustrates an exemplary environment illustrating changes within the environment resulting from assignment of a semaphore according to examples of the disclosure. Specifically, FIG. 3B illustrates changes in environment 100 that arise after a semaphore associated with object 300 is assigned to user 399 (illustrated as user 310C in FIG. 3A). User 399 can represent a user who has requested, or otherwise made a selection, to summon semaphore 306B. In particular, user 399 can represent a user who has selected a user interface element 308B-1 associated with semaphore receptacle 304B and/or associated semaphore 306B, performed an indirect gesture corresponding to summoning a semaphore (e.g., by directing gaze and/or an input device towards semaphore receptacle 304B and performing a particular gesture), or performed a direct gesture corresponding to summoning a semaphore (e.g., by approaching semaphore 306B and performing a gesture corresponding to touching, grabbing, or picking up the semaphore at the location of the semaphore within the environment.

For ease of description, FIG. 3B assumes that user 399 performs an indirect gesture to summon semaphore 306B. An original position of semaphore 306B is shown in FIG. 3A and reproduced in dashed lines in FIG. 3B. After user 399 performs the indirect gesture to summon semaphore 306B, the system (first device 260 of FIG. 2, which can be responsible for hosting environment 100 or second device 270 of FIG. 2, which can display environment 100) can determine whether semaphore 306B can be summoned by user 399. In the absence of any conflicts that would prevent the system hosting environment 100 from fulfilling the request to summon semaphore 306B, a user-semaphore assignment between user 399 and semaphore 306B can be made (e.g., a user-semaphore ledger can be updated to reflect a new association between user 399 and semaphore 306B). In response to the user-semaphore assignment between user 399 and semaphore 306B being made, environment 100 may be updated to reflect this new user-semaphore assignment. In some examples, the update to the environment can include relocating semaphore 306B to within a threshold distance DTH of user 399. In some examples, semaphore 306B may be animated as moving from its original position within semaphore receptacle 304B along a path illustrated in dashed lines until semaphore 306B is located within a threshold distance DTH of user 399. In some examples, DTH can represent a suitable distance from the visual representation of a particular user (e.g., user 399) assigned a particular semaphore that identifies the particular user who is the subject of any user-semaphore assignment. In some examples, as user 399 moves or traverses space within environment 100, semaphore 306B may retain fixed at a particular position relative to the visual representation of user 399 (e.g., avatar), within the threshold distance DTH.

Additionally or alternatively, other aspects of the environment besides the physical location of semaphore 306B may change in response to a new user-semaphore assignment being made between user 399 and semaphore 306B. As an example, because semaphore 306B confers write access privileges to object layer 302B of object 300, the visual representation of object layer 302B may be updated to include an indication that changes can be made to the object layer (e.g., a graphically superimposed "unlocked" icon can replace the "lock" icon illustrated on top of object layer 302B in FIG. 3A, or any other suitable graphical indication). As another example, visual characteristics of users within the environment 100 can be modified to indicate that user 399 has been promoted to a different class than users 390A and 390B (formerly represented as users 310A and 310B). In some examples, user 399 can be shown with an enhanced or highlighted visual characteristic that is different than the visual representation(s) used to represent users 390A or 390B. In such examples, the visual representation or avatar of user 399 can be displayed in brighter colors, or with improved brightness, contrast, definition, sharpness, clarity, opacity, or any other suitable improved visual characteristic relative to the other users 390A or 390B. In such examples, improved visual characteristics can refer to emphasized or elevated levels of visual characteristics for displaying the visual representation or avatar of user 399 (e.g., relative to visual characteristics associated with displaying other users), such that the visibility of the visual representation or avatar of user 399 is improved. As an example, improved opacity can refer to increased opacity levels (e.g., the visual representation or avatar of user 399 is displayed with higher opacity relative to the visual representations or avatars of other users). As another example, improved contrast can refer to sharpened or elevated contrast of the visual representation or avatar of user 399, or equivalently, softened, or lower contrast of the visual representations or avatars of other users. Emanations 312 from the visual representation of user 399 of FIG. 3B are intended to indicate the improvements to the visual representation of user 399 (e.g., a modified visual characteristic) that environment 100 confers to user 399 in response to the new user-semaphore assignment. In such examples, users 390A or 390B can be represented with a visual characteristic that is relatively dulled, darkened, or diminished, relative to the visual characteristic of user 399. In some examples, audio inputs of user 399 can be played back within environment 100 using different audible playback settings relative to the playback settings applied to audio inputs of users 390A or 390B. As indicated by the bolded representation of sound waves 320 emanating from user 399, audio inputs of user 399 can be played back at an audio level that is relatively louder and/or more clearly than audio levels used to play back respective audio inputs of users 390A or 390B. In some such examples, audio inputs of user 390A can be muted (as indicated by mute icon 324 next to user 390A), or diminished/attenuated (as indicated by the diminished/attenuated representation of sound waves 322 next to user 390B).

In some examples, changes to the audio and/or visual attributes of a user's audio inputs and/or visual representation can be temporary within environment 100 and/or dependent on user-semaphore assignments. In some examples, the emanations 312 associated with improved visual attributes of a representation of user 399 may last only as long as user 399 is assigned semaphore 306B. Similarly, improvements to the audible playback of audio inputs from user 399 may last only as long as user 399 is assigned semaphore 306B. In some examples, users assigned a semaphore can be afforded improved visual attributes and/or improved audio playback for as long as the user-semaphore relation remains in place. In some examples, the improved visual attributes and/or improved audio playback may remain for a threshold period of time after assignment. In examples where the user-semaphore relation is scheduled to last a particular amount of time, the improvements to a user's visual attributes and/or audio playback can diminish (e.g., return to a baseline level) towards the end of the particular amount of time.

In some examples, changes to the attributes of a user assigned a semaphore are visible to other users. In such examples, the focus of other users can be drawn to the user assigned the semaphore by virtue of changes to the overall representation of the user in the environment, such as: emphasized or modified visual attributes or characteristics to the visual representation of the user, amplified audio levels or improved playback settings for an audio input stream of the user, and a visual representation of the semaphore being moved to within a threshold distance of a visual representation of the user. Notably, in some examples, these changes to the overall representation of the user in the environment are only visible to other users, but not the user whose overall representation has been changed. In such examples, the user assigned a semaphore may not be aware of, or presented a view of the environment that includes the emphasized or modified visual attributes to his/her own visual representation within the environment, the amplified or improved playback settings for his/her own audio input stream, or the visual representation of the semaphore being moved to within a threshold distance of a visual representation of the user. In some examples, a visual representation of the semaphore is moved to within a threshold distance of a visual representation of the user, at a location of the visual representation of the user that is not visible to the user through his/her view of the environment (e.g., a location above the shoulders of an anthropomorphic avatar representation of a user). In some examples, a semaphore can be visually represented with a crown symbol, and moved to within a threshold distance of a visual representation of a user, above its shoulders (e.g., a crown-shaped semaphore is placed atop the head of a visual representation of a user). In such examples, the user assigned the crown-shaped semaphore may be unable to see the crown atop his/her own visual representation within the environment (or any focus-directing modifications to his/her overall representation within the environment). In some examples, any of the modifications to a representation of a user assigned a semaphore within the environment can be reversed in the view of another user who has noticed or acknowledged the user assigned the semaphore. In some examples, users who have directed their focus towards a user assigned a semaphore with a modified representation for a threshold duration of time, can be provided a view of the environment in which the user assigned the semaphore has an unmodified representation.

FIG. 4 illustrates exemplary rows and columns of a user-semaphore ledger that can be maintained by a processing device that has access to a multi-user collaborative environment in accordance with examples of this disclosure. As an example, in connection with the exemplary architecture described above in connection with FIG. 2, memory 220A of first device 260 (e.g., the environment hosting resource) can store a data structure representing user-semaphore ledger 400, illustrated in FIG. 4. User-semaphore ledger 400 can be maintained by a maintenance engine, or a process executed on processor 218A. In some examples, user-semaphore ledger 400 is maintained based on user activity within a multi-user collaborative environment (e.g., environment 100). In some examples, scheduled assignments of semaphores to particular users within an environment can be fulfilled based on changes to user-semaphore ledger 400 (e.g., new user-semaphore assignments can be established within environment 100 in response to changes in ledger 400).

Rows 402 of user-semaphore ledger 400 can correspond to users within environment 100. For simplicity's sake, rows 402 include the three users illustrated in FIGS. 3A and 3B (though ledger 400 can provide additional rows 402 for additional users, including users not currently present in environment 100). Columns 404A, 404B, 406, 408, and 410 can be provided for each of the users represented by rows 402. In some examples, ledger 400, as illustrated, can be referred to as a "per-user" ledger of semaphore statistics (e.g., because semaphore usage statistics associated with each respective user are tracked and recorded). Alternatively, ledger 400 can be formatted such that it is referred to as a "per-semaphore" ledger of user statistics (e.g., with rows corresponding to semaphores within the environment, and columns corresponding to user usage/assignment statistics associated with the semaphores).

Columns 404A and 404B of ledger 400 can represent columns corresponding to the current state of user-semaphore assignments within environment 100 (e.g., the state represented in FIG. 3B), in some examples. As indicated by column 404A, which corresponds to current semaphore assignments, users 310A/390A and 310B/390B are not currently any semaphores, and user 310C/399 is assigned semaphore 306B (e.g., the semaphore shown moving from semaphore receptacle 304B to within a threshold distance DTH of user 399 in FIG. 3B). Column 404A may be updated based on changes to the user-semaphore assignments within environment 100. Column 404B corresponds to the elapsed time of the current semaphore assignments, which is not applicable to users 310A/390A or 310B/390B (since they are not currently assigned any of the semaphores), and has a value of 2 minutes and 22 seconds for user 310C/399

(indicating that semaphore 306B has assigned to user 399 for that duration of time). In some examples, column 404B can be continuously or periodically updated to reflect the elapsed time more accurately for current user-semaphore assignments.

Columns 406 of ledger 400 can represent elapsed semaphore assignment time for each user, during each user's current respective session within environment 100, in some examples. A particular user's session within environment 100 can, for ease of explanation, be defined as the interval between the particular user joining environment 100 and the particular user leaving environment 100. Columns 406 can contain one column per semaphore within environment 100 (e.g., a first column for semaphore 306A, a second column for semaphore 306B, and a third column for semaphore 306C in the context of FIG. 3B). Each given column of columns 406 can be populated with time values corresponding to the sum of all the intervals the semaphore associated with that given column has been assigned to particular users within environment 100 for the present session. As an example, ledger 400 may indicate that no user is currently assigned semaphores 306A or 306B (e.g., by columns 404A and/or 404B). In such an example, the first and second columns of columns 406 that correspond to semaphores 306A and 306B can contain static values corresponding to the sum of time durations that each of the users represented by rows 402 was assigned the respective semaphores during a current session of the user. As an example, columns 406 illustrated in FIG. 4 indicate that user 310A/390A was assigned semaphore 306A for a total of 12 minutes and 12 seconds, and was not assigned semaphore 306B for any time (0 minutes and 0 seconds) during the current session (e.g., during the time elapsed from when user 310A/390A joins environment 100, to when the user leaves the environment). A third column of columns 406 can correspond to semaphore 306C, which is assigned to user 310C/399 (as indicated by columns 404A and/or 404B). In such an example, the values of this third column corresponding to users 310A/390A and 310B/390B can be static values corresponding to the sum of time durations that each of the respective users was assigned semaphore 306C (e.g., during their respective sessions), and the value corresponding to user 310C/399 can be a dynamic value corresponding to the sum of time durations that the user was assigned semaphore 306C (e.g., that updates in real time, as long as a current user-semaphore assignment between user 310C/399 and semaphore 306C exists).

Columns 408 of ledger 400 can represent elapsed semaphore assignment times, for each user, during the entirety of the user's history of being assigned any of the semaphores within environment 100, in some examples. A particular user's history of being assigned the semaphores within environment 100 can, for ease of explanation, refer to the sum of the elapsed semaphore assignment times in each of the sessions that the particular user has joined, or participated in environment 100. In other words, a particular user's history of being assigned any of the semaphores within environment 100 can be represented by the sum of the per-session assignment durations (e.g., the values of columns 406), sampled at the end of each session for the particular user. In some examples, columns 408 are updated only when a user leaves environment 100, or otherwise ends his/her session. In other examples, columns 408 are updated in real-time, as the elapsed time column 404B and the corresponding column for a semaphore within columns 406 are updated in real-time (e.g., as time elapses during any particular user-semaphore assignment within the environment). Columns 408 can contain one column per semaphore within environment 100 (e.g., a first column for semaphore 306A, a second column for semaphore 306B, and a third column for semaphore 306C in the context of FIG. 3B). In some examples, columns 408 can represent the overall edit time that a user has had in connection with a particular object layer (e.g., in examples where a user can edit object layers through alternate means, where semaphore assignments are not required to acquire write access privileges to object layers). For any particular user represented by rows 402, each given column of columns 408 can be populated with time values corresponding to the sum of all session assignment durations (e.g., values from columns 406 at the end of a user's session) for a semaphore. In some examples, any given column of columns 408 can be populated with time values corresponding to the sum of all session assignment durations for a semaphore (e.g., on a per-user basis), added to values from columns 406 and/or 404A. As an example, ledger 400 may indicate that no user is currently assigned semaphores 306A or 306B (e.g., by columns 404A and/or 404B). In such an example, the first and second columns of columns 406 that correspond to semaphores 306A and 306B can contain static values corresponding to the sum of time durations that each of the users represented by rows 402 was assigned the respective semaphores, during a current session of the user. In such an example, the first and second columns of columns 408 that correspond to semaphores 306A and 306B can contain static values corresponding to the values in the first and second columns of columns 406, added to historical semaphore assignment durations from all the previous sessions of the users within the environment. As an example, columns 408 as illustrated in FIG. 4 indicate that user 310A/390A was assigned semaphore 306A for a total of 15 minutes and 15 seconds historically (e.g., considering all past sessions, optionally including the present session), and that user 310A/390A was assigned semaphore 306B for a total of 26 minutes and 26 seconds historically. A third column of columns 408 can correspond to semaphore 306C, which is assigned to user 310C/399 (as indicated by columns 404A and/or 404B). In such an example, the values of this third column corresponding to users 310A/390A and 310B/390B can be static values corresponding to the sum of time durations that each of the respective users was assigned semaphore 306C (e.g., during all past respective sessions, optionally including the current session), and the value corresponding to user 310C/399 can be a dynamic value corresponding to the sum of time durations that the user was assigned semaphore 306C in all past sessions including the current section (e.g., a value that updates in real time, as long as a current user-semaphore assignment between user 310C/399 and semaphore 306C exists).

User-semaphore ledger 400, in this way, can contain columns with semaphore assignment timing information for each user in rows 402. In some examples, column 404B can contain semaphore assignment timing information for a particular assignment (e.g., current assignments). In some examples, columns 406 contain semaphore assignment timing information for a particular session (e.g., the current session). In some examples, columns 406 contain total semaphore assignment timing information (e.g., the sum of all past sessions, optionally including the current session). Columns 406 can be based on historical values recorded in column 404B, and can be further based on the specific semaphore indicated in column 404A corresponding to the timing information values of column 404B. Columns 408 can be based on historical values recorded in columns 406 and 404B. These columns of ledger 400 can be updated periodically, in real-time, or in response to certain trigger events (e.g., a new user-semaphore assignment being established, a user beginning a session within environment 100, a user ending a session within environment 100, etc.). In some examples, updates to the columns of ledger 400 can be performed by a first device 260 (e.g., the environment hosting resource) described in connection with the exemplary architecture of FIG. 2, and can be performed by processor(s) 218A (e.g., by the execution of instructions that perform a maintenance process for ledger 400).

Ledger 400 can include additional columns for timing information data that are not illustrated by FIG. 4. As an example, an additional column can contain row entries corresponding to assignment quota durations. In such examples, an assignment quota duration can indicate a maximum time interval (usually for an individual session, but also applicable to a "historical" or total duration of semaphore assignment) that a user can be assigned a particular semaphore. As an example, if an assignment quota duration associated with a semaphore for an individual session is 30 minutes, a user-semaphore assignment between a particular user and the semaphore that exceeds 30 minutes can trigger a response from the system or computing resources hosting environment 100. In response to a user-semaphore assignment being maintained in excess of an associated assignment quota duration, the computing resources hosting environment 100 may respond by de-assigning the semaphore from the user, by changing the user to which the semaphore is assigned, lowering a priority level associated with the user assigned the semaphore for longer than the assignment quota duration, or by prompting other users to summon the semaphore (e.g., to transfer the semaphore away from the user assigned the semaphore for longer than the assignment quota duration).

In some examples, ledger 400 can include column 410, which represents user-specific rules that an environment 100, or a supervisory engine for maintaining environment 100, can enforce with regards to fulfilling user-semaphore assignment requests and/or establishing scheduled user-semaphore assignments. Each row entry in column 410 can contain any number of rules to be applied to the corresponding user associated with the row. As an example, a row entry in column 410 corresponding to user 310A/390A can indicate that the user is to be given the highest priority (e.g., relative to any other user in the environment) when resolving requests for semaphore 306A. In such an example, if a processor 218A of first device 260 (e.g., the environment hosting resource) of FIG. 2 receives two competing (e.g., concurrent) requests to summon semaphore 306A, a request from user 310A/390A may be fulfilled over a request from any other user. As another example, a row entry in column 410 corresponding to user 310B/390B can indicate that the user is to be scheduled for assignment of semaphore 306B in the event that semaphore 306B has been assigned to user 310C/399 for a duration of time exceeding the assignment quota duration. In such an example, computing resources hosting environment 100 can refer to column 410 in response to the duration of time that user 310C/399 has been assigned semaphore 306B for a given session, or in total (e.g., the third-row entry of the second column of columns 406, or of the second column of columns 408) has exceeded an assignment quota duration (not illustrated in FIG. 4). In such an example, semaphore 306B can be scheduled for a transfer from user 310C/399 to user 310B/390B, in response to the assignment quota duration associated with user 310C/399 being exceeded. As another example, a row entry in column 410 corresponding to user 310C/399 can indicate that the user is to be assigned a lower priority after 30 minutes of any semaphore assignment. In such an example, the 30-minute limit before user priority is lowered can refer to a limit on the per-session assignment duration of any semaphore assignment to user 310C/399 (e.g., values in columns 406 corresponding to the user), or the total historical assignment duration to user 310C/399 (e.g., values in columns 408 corresponding to the user).

Figure 5:
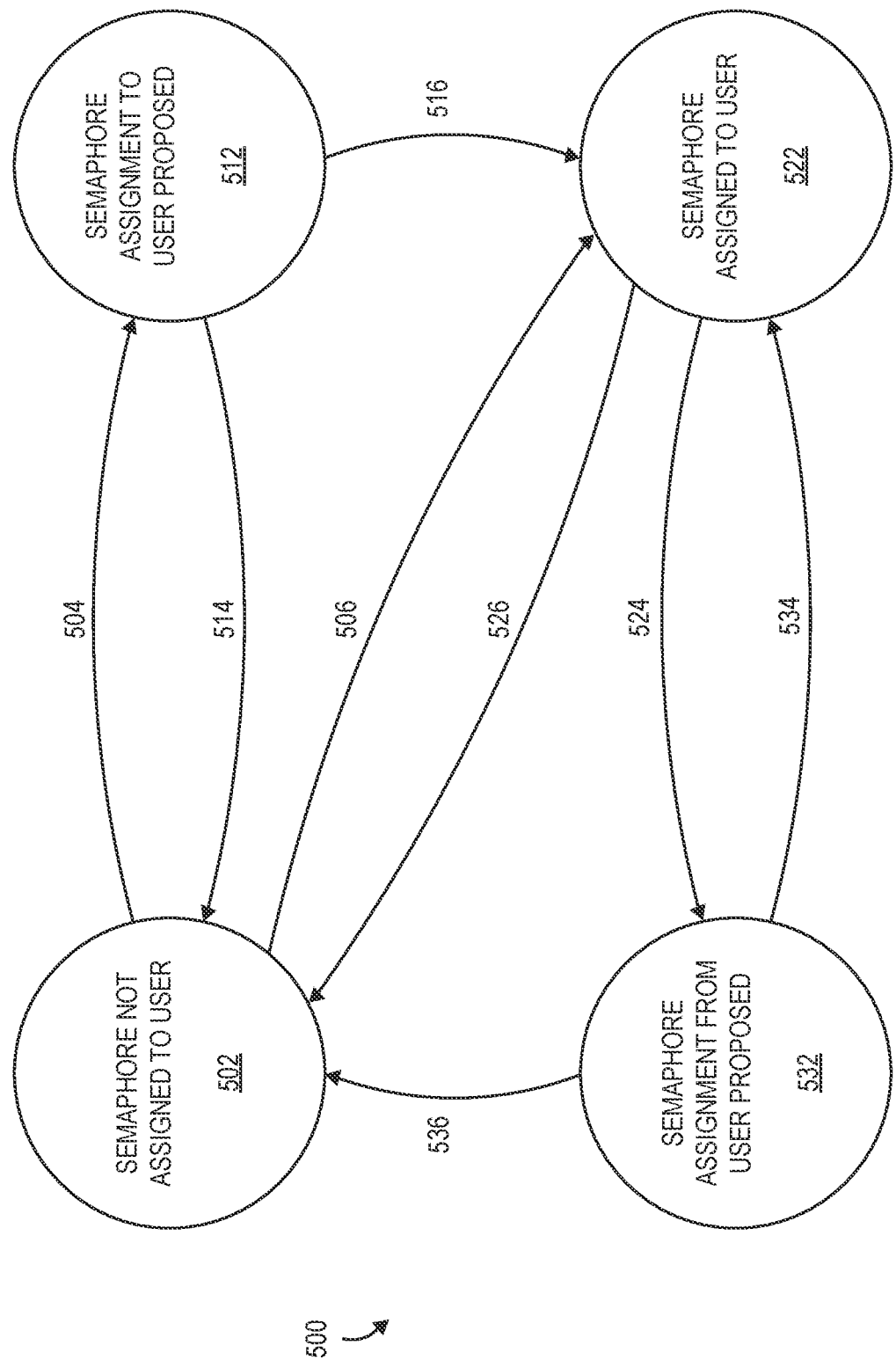
FIG. 5 illustrates an exemplary state machine for resolving and avoiding collisions between competing requests to change user-semaphore assignments, according to examples of the disclosure.

FIG. 5 illustrates an exemplary state machine for resolving and avoiding collisions between competing requests to change user-semaphore assignments according to examples of the disclosure. As an example, in connection with the exemplary architecture described above in connection with FIG. 2, memory 220A of first device 260 (e.g., the environment hosting resource) can store instructions for processor 218A to transition between any of the states shown in FIG. 5 according to the transition conditions between the various states. States illustrated by FIG. 5 can relate to states associated with a single user and a particular semaphore (e.g., a first user and a first semaphore), in some examples. In some such examples, processor 218A can maintain multiple state machines that correspond to the possible user-semaphore pairings in an environment, with the state machines making determinations in accordance with transition criteria between states (e.g., the various conditions described below). In particular, the exemplary state machine 500 illustrates four states: a first state 502 corresponding to no user-semaphore assignment between a first user and a first semaphore, a second state 512 corresponding to a proposed user-semaphore assignment to/for the first user and the first semaphore, a third state 522 corresponding to the first user being assigned to the first semaphore, and a fourth state 532 corresponding to a proposed user-semaphore assignment for the first semaphore from the first user.

In some examples, each state machine corresponding to semaphores within an environment can be instantiated (e.g., before any users have joined environment 100) at the first state 502, corresponding to no user-semaphore assignment. A processor (e.g., processor 218A, or 218B) can evaluate one or more criteria related to the environment, and transition between states in accordance with a determination that the one or more criteria are satisfied.

As an example, while a first semaphore is not assigned to the first user (e.g., state machine 500 is set to state 502), a processor can evaluate a number of conditions or criteria that can cause state machine 500 to transition from state 502 to state 522 (e.g., state transition 506 is invoked in accordance with a determination that one or more criteria have been satisfied). As an example of a criterion that, when satisfied, can invoke state transition 506 is a determination (e.g., by a processor) of whether the first user has requested the first semaphore, and whether the first semaphore is also not assigned to any other user. As mentioned above in connection with FIG. 1, a semaphore within a receptacle is not assigned to any user, and can therefore be freely summoned directly by any user within environment 100 (e.g., without needing to transition first to state 512). In such an example, in accordance with a determination that the first user has requested the first semaphore, and that the first semaphore is not assigned to any other user (e.g., the first semaphore is located within its receptacle), state machine 500 can invoke state transition 506 and transition from state 502 to state 522.

In some examples, while the first semaphore is not assigned to the first user (e.g., the state machine of FIG. 5 is set to state 502), a processor can evaluate whether a first user should be assigned the first semaphore according to a schedule (e.g., a timed sequence of user-semaphore assignments enforced by computing resources hosting environment 100, or a time-dependent response to a user-semaphore assignment quota duration being exceeded). In some such examples, a user-semaphore assignment dictated by a schedule has highest priority (over assignment to other users), and in accordance with a determination that the schedule selects or dictates that the first user should be assigned the first semaphore, state machine 500 of FIG. 5 can invoke state transition 506 and transition directly to state 522, where a new user-semaphore assignment is performed for the first user and first semaphore.

When a state machine has transitioned to state 522, a new user-semaphore assignment has been established. In some examples, transitioning to state 522 can be associated with updating a user-semaphore ledger (e.g., ledger 400 of FIG. 4) to indicate the new user-semaphore assignment. As an example, while a first semaphore is assigned to the user (e.g., state machine 500 is set to state 522), a processor can evaluate a number of conditions or criteria that can cause state machine 500 to transition from state 522 to state 502 (e.g., state transition 526 occurs in accordance with a determination that one or more criteria have been satisfied). As an example of a criterion that, when satisfied, can invoke state transition 526 is a determination (e.g., by a processor) that a first user assigned a first semaphore has requested to surrender the first semaphore (e.g., the first user has provided user input corresponding to a request/selection to de-assign the semaphore, or return the semaphore to its respective receptacle). In such an example, in accordance with a determination that the first user is requesting to surrender or relinquish a first semaphore, state machine 500 can invoke state transition 526 and transition from state 522 to state 502. In this example, the first user is permitted to surrender the first semaphore without any further determinations. In other examples, state machine 500 can invoke state transition 524 and transition to state 532 in accordance with a determination that the first user requests to surrender or relinquish a first semaphore (e.g., in examples where the first user requires authorization to surrender the semaphore).

As another example of a criterion that, when satisfied, can invoke state transition 526 is a determination that a first user assigned a first semaphore has a been assigned a first semaphore for a duration that exceeds an assignment quota time or another time-based condition for being assigned the particular semaphore. In such an example, in accordance with a determination that the first user has been assigned the first semaphore for a duration that exceeds the assignment quota time, or other time-based condition for being assigned the particular semaphore, the state machine can transition from state 522 to state 502, where the user-semaphore assignment between the first user and the first semaphore is dissolved or ended (e.g., the first user is no longer assigned the first semaphore, and the first semaphore is not assigned to any user).

Returning to state 502 where a first user is not assigned a first semaphore, state machine 500 includes a state 512 where user-semaphore assignment to/for the first user can be proposed. In some examples, rather than a direct transition from state 502 to state 522 (e.g., via state transition 506), a transition from state 502 to state 512 can be performed (e.g., via state transition 504). As an example, while a first semaphore is not assigned to the first user (e.g., state machine 500 is set to state 502), a processor can evaluate a number of conditions or criteria that can cause state machine 500 to transition from state 502 to state 522 (e.g., state transition 504 is invoked in accordance with a determination that one or more criteria have been satisfied). As an example of a criterion that, when satisfied, can invoke state transition 504 is a determination of whether the first user has requested the first semaphore from a second user (e.g., another user within environment 100 who has a user-semaphore assignment with the first semaphore). In some such examples, contention can exist in the user-semaphore assignments because forming a new user-semaphore assignment between the first user and the requested first semaphore may also require dissolving (or de-assigning) an old user-semaphore assignment between the second user and the first semaphore. In some examples, to solve this contention, state machine 500 transitions to state 512, corresponding to a proposed assignment between the requested first semaphore and the requesting first user (e.g., instead of transitioning directly to state 522).

In some examples, where the first semaphore is not assigned to the first user (e.g., the state machine of FIG. 5 is set to state 502), another example of a criterion that, when satisfied, can invoke state transition 504 is a determination of whether a second user has requested to assign the first user the first semaphore. In some such examples, the second user with a current user-semaphore assignment to a first semaphore requests to transfer the first semaphore to the first user (e.g., the first user associated with state machine 500). In some such examples, the second user requests to transfer the first semaphore to the first user from a third user with a current user-semaphore assignment to the first semaphore. In accordance with a determination that a second user has requested to assign the first user the first semaphore, state machine 500 can invoke state transition 504 and transition to state 512, where a new user-semaphore assignment is proposed for the first user and the first semaphore.

When state machine 500 has transitioned to state 512, a new user-semaphore assignment has been proposed for the first user associated with state machine 500. In some examples, transitioning to state 512 can be associated with consulting user-semaphore ledger (e.g., ledger 400 of FIG. 4) to verify authorization credentials of users, determine assignment priority of users with regards to particular semaphores, or reference any user-specific restriction or rules associated with the first user (e.g., by consulting column 410 of ledger 400).

As an example, while a first semaphore is proposed to be assigned to the first user, a processor can evaluate a number of conditions or criteria that can cause state machine 500 to transition from state 512 back to state 502 (e.g., state transition 514 occurs in accordance with a determination that one or more criteria have been satisfied). In some examples, the first semaphore associated with the proposed new user-semaphore assignment is already assigned to a second user (e.g., the proposed new user-semaphore assignment conflicts with a pre-existing user-semaphore assignment within the environment). In some such examples, a first user associated with state machine 500 can request to assign the first semaphore associated with the state machine to himself/herself (e.g., self-assignment, or summoning of the particular semaphore). In other such examples, a second user can be requesting to assign the first semaphore to the first user associated with state machine 500 (e.g., when the first semaphore is either unassigned located in a receptacle, assigned to the second user, or assigned to a third user different from the first and second users). As an example of criteria that, when satisfied, can invoke state transition 514 is a determination that the first user is not authorized to be assigned the first semaphore (e.g., due to invalid/outdated user credentials, or any other suitable security concern with regards to the object or object layers associated with the first semaphore), and/or a determination that the first user does not have sufficient priority to be assigned the semaphore (e.g., the first user has a lower priority to be assigned the first semaphore relative to other users in the environment). In such an example, in accordance with a determination that the first user is not authorized or lacks sufficient priority to be assigned the first semaphore, state machine 500 can invoke state transition 514 to transition back to state 502, from state 512.

In some examples, while a first semaphore is proposed to be assigned to the first user, a processor can evaluate a number of conditions or criteria that can cause state machine 500 to transition from state 512 to state 522 (e.g., state transition 516 occurs in accordance with a determination that one or more criteria have been satisfied). In some examples, the first semaphore associated with the proposed new user-semaphore assignment is already assigned to a second user (e.g., the proposed new user-semaphore assignment conflicts with a pre-existing user-semaphore assignment within the environment). In some such examples, a first user associated with state machine 500 can be requesting to assign the first semaphore associated with the state machine to himself/herself (e.g., self-assignment, or summoning of the particular semaphore). In other such examples, a second user can be requesting to assign the first semaphore to the first user associated with state machine 500 (e.g., when the first semaphore is either unassigned located in a receptacle, assigned to the second user, or assigned to a third user different from the first and second users). As an example of a criterion that, when satisfied, can invoke state transition 516 is a determination that the first user is authorized to be assigned the first semaphore (e.g., due to invalid/outdated user credentials, or any other suitable security concern with regards to the object or object layers associated with the first semaphore). Additionally or alternatively, in some examples, a determination that the first user has sufficient priority to be assigned the first semaphore (e.g., the first user has an equal/greater priority to be assigned the first semaphore relative to a user currently assigned the first semaphore, or other users in the environment) can invoke state transition 516. In such an example, in accordance with a determination that the first user is authorized and/or has sufficient priority to be assigned the first semaphore, state machine 500 can invoke state transition 516 to transition from state 512 to state 522. In some examples, when state machine 500 is set to state 512 (e.g., by checking for any rules/conditions prohibiting the user from being assigned the semaphore, such as rules listed in column 410 of FIG. 4), a processor can determine whether to invoke state transition 514 and return to state 502 (e.g., when there are rules/conditions prohibiting the user from being assigned the semaphore, such as lack of authorization or insufficient priority), or whether to invoke state transition 516 and transition to state 522 (e.g., when the user has authorization and/or sufficient priority to be assigned the first semaphore).

When state machine 500 has transitioned to state 522, a user-semaphore assignment has been performed or established between the first user and the first semaphore. In some examples, transitioning to state 522 can be associated with moving a visual representation of the first semaphore to within a threshold distance DTH of a visual representation of the first user, and/or conveying write access privileges to an object or object layer within environment 100.

In some examples, when the first semaphore is assigned to the first user, a processor can evaluate a number of conditions or criteria that can cause state machine 500 to transition from state 522 to state 532 (e.g., via state transition 524). In other words, state machine 500 can invoke state transition 524 in accordance with a determination that one or more criteria have been satisfied. In some examples, a processor can determine whether the first user associated with state machine 500 requests the first semaphore be transferred to a second user (e.g., another user in the environment). In such an example, in accordance with a determination that the first user requested the first semaphore be transferred to a second user, state machine 500 can invoke state transition 524 and transition from state 522 to state 532. As mentioned above in connection with state transition 526, in some examples, the first user is permitted to surrender the first semaphore without any further determinations. However, in some examples, such as where the first user requires authorization to surrender the semaphore, state machine 500 can invoke state transition 524 and transition from state 522 to state 532 in accordance with a determination that the first user requests to surrender or relinquish the first semaphore.

When state machine 500 has transitioned to state 532, the first user has proposed a new user-semaphore assignment for the first semaphore. In some examples, transitioning to state 532 can be associated with consulting user-semaphore ledger (e.g., ledger 400 of FIG. 4) to verify authorization credentials of users, determine assignment priority of users with regards to particular semaphores, or reference any user-specific restriction or rules associated with the first user (e.g., by consulting column 410 of ledger 400).

In some examples, while the first user proposes assigning the first semaphore to a second user, or proposes surrendering the first semaphore, a processor can evaluate a number of conditions or criteria that can cause state machine 500 to transition from state 532 back to state 522 (e.g., state transition 514 occurs in accordance with a determination that one or more criteria have been satisfied). In some examples, the first user proposes assigning the first semaphore to a second user. In such examples, a processor can determine whether the first user is authorized to transfer the particular semaphore to the second user (e.g., by checking for any rules/conditions prohibiting the first user from transferring the semaphore to the second user, such as rules listed in column 410 of FIG. 4). In response to determining that the first user is not authorized to transfer the first semaphore to the second user, state machine 500 can transition from state 532, to state 522, where the first semaphore remains assigned to the first user (e.g., the user-semaphore assignment between the first user and the first semaphore remains in force, and is not dissolved or removed).

In some examples, the first user requests to relinquish or surrender the first semaphore. In such examples, a processor can evaluate whether the particular user is authorized to surrender the particular semaphore (e.g., by checking for any rules prohibiting the user from surrendering the semaphore, such as rules listed in column 410 of FIG. 4). In response to determining that the first user is not authorized to surrender the particular semaphore, the state machine can transition from state 532, to state 522, where the first semaphore remains assigned to the first user.

In some examples, while the first user proposes a new user-semaphore assignment for the first semaphore (e.g., when state machine 500 is at state 532), a processor can evaluate a number of conditions or criteria that can cause state machine 500 to transition from state 532 to state 502 (e.g., state transition 536 occurs in accordance with a determination that one or more criteria have been satisfied).

In some examples, where the first user is requesting to assign a particular semaphore to a second user, a processor can evaluate whether the first user is authorized to re-assign the semaphore (e.g., by checking for any rules prohibiting the first user from re-assigning the semaphore, such as rules listed in column 410 of FIG. 4). In accordance with the determination that the first user is authorized to re-assign the semaphore, the state machine can transition from state 532 to state 502, where the first user is no longer assigned to the particular semaphore. In such examples, state machine 500 returning to state 502 frees up the first semaphore to be assigned to the second user (a change reflected in and effected by the state machine associated with the first semaphore and the second user).

In some examples, where the first user requests to relinquish or surrender the first semaphore from himself/herself, a processor can evaluate whether the first user is authorized to surrender the first semaphore (e.g., by checking for any rules prohibiting the user from surrendering the semaphore, such as rules listed in column 410 of FIG. 4). In response to determining that the first user is authorized to surrender the particular semaphore, the state machine can transition from state 532, to state 502, where the first user is no longer assigned to the particular semaphore (and the particular semaphore is returned to its associated semaphore receptacle).

Figure 6:
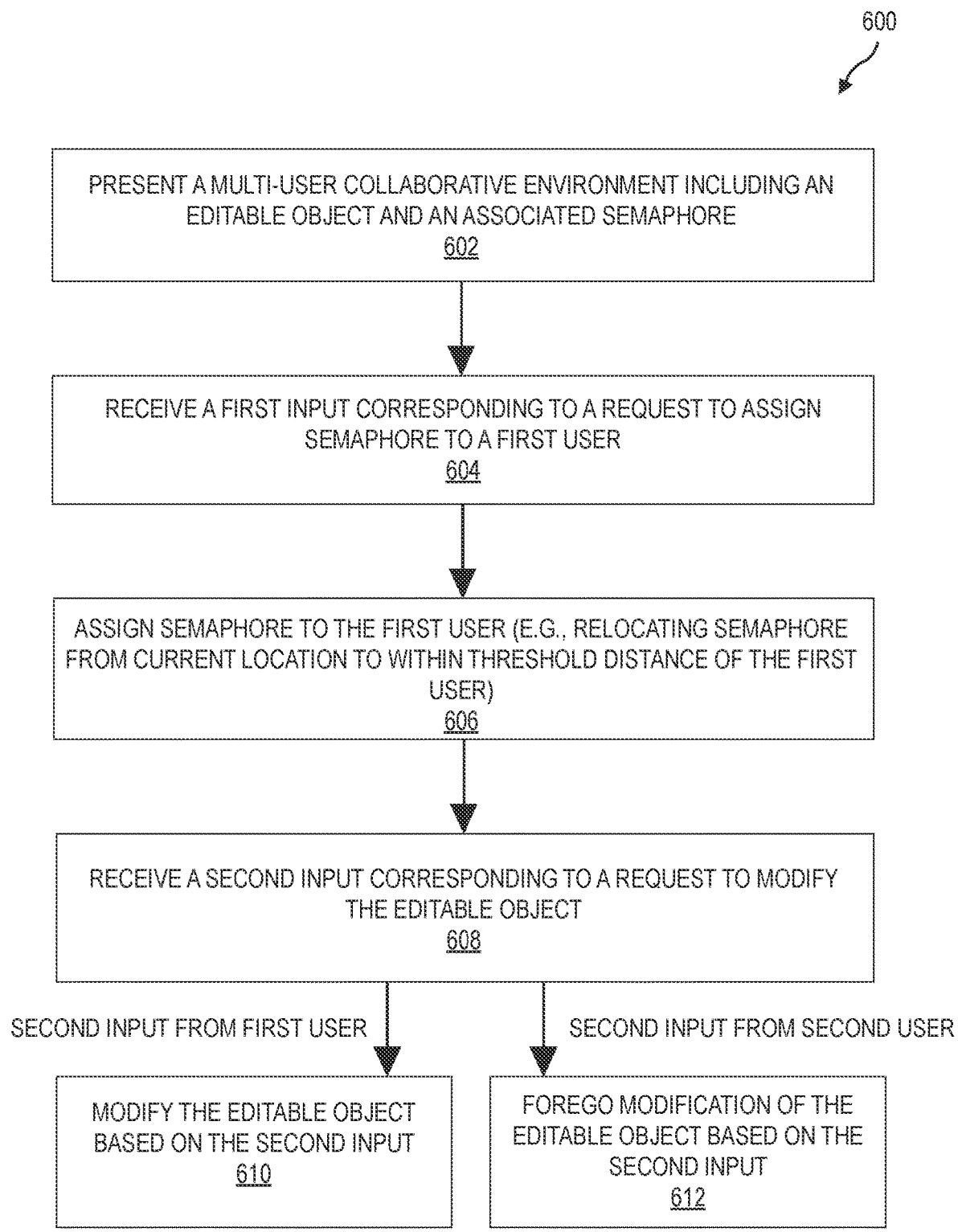
FIG. 6 illustrates an exemplary process for using a semaphore in a multi-user collaborative environment, according to examples of the disclosure.

FIG. 6 illustrates an example process 600 for using a semaphore in a multi-user collaborative environment in accordance with some examples of the disclosure. Process 600 is optionally performed at an electronic device such as system 250, device 260, or device 270. Some operations in process 600 are optionally combined and/or optionally omitted. The order of some operations in process 600 is optionally changed, in some examples.

In some examples, process 600 is performed at a computing system in communication with a display generation component and one or more input devices. In some examples, the computing system presents (602), via the display generation component, a multi-user collaborative environment including an editable object and a first semaphore object that corresponds to one or more first tasks associated with the editable object. In some examples, while presenting the multi-user collaborative environment, the computing system receives (604), a first input (e.g., via the one or more input devices) corresponding to a request to assign the first semaphore object to the first user. The first input can correspond to a request from the first user (e.g., received via a device 270 associated with the first user), to summon, acquire, or self-assign the first semaphore (e.g., the example process described in FIG. 7). In some examples, the first input can correspond to the first user performing a grip or gripping gesture with respect to a visual representation of the semaphore. In some examples, the first input can further correspond to moving the gripped visual representation of the semaphore to within a threshold distance DTH of a visual representation of the first user (e.g., the first user moves the visual representation of the semaphore close to his/her avatar). The first input can also correspond to a request from another user to assign the semaphore to the first user. In some examples, the request to assign the semaphore to the first user does not have to originate from a user, and can be generated by the system in response to a schedule, timer, time-based criteria, or location-based criteria.

In some examples, the computing system assigns (606) the first semaphore object to the first user in accordance with the first input (e.g., in response to receiving the first input). In some examples, assignment of the first semaphore object can include a visual representation of the assignment of the first semaphore object within the multi-user collaborative environment that moves within the multi-user collaborative environment in accordance with movement of the first user. An example of the visual representation of the assignment of the first semaphore object is described above in connection with FIG. 3B, where semaphore 306B is moved within environment 100 to within a threshold distance DTH of a visual representation of user 399, upon being assigned to that user. In such examples, where the visual representation of the assignment of the first semaphore object includes moving the semaphore object within the environment to within a threshold distance of a visual representation of the user, the first semaphore object can remain positioned within the fixed threshold distance of the visual representation of the user as the user traverses space (e.g., changes positions or locations) within the multi-user collaborative environment.

In some examples, the computing system receives (608) a second input requesting to modify the editable object corresponding to the one or more first tasks associated with the editable object. In some examples, in accordance with a determination that the second input is from the first user to which the first semaphore object is assigned and directed to the one or more first tasks, the computing system modifies (610) the editable object in accordance with the second input. In accordance with a determination that the second input is from a second user to which the first semaphore object is not assigned or is from the first user to which the first semaphore object is assigned but directed to one or more second tasks not corresponding to first semaphore object, the computing system forgoes modifying (612) the editable object in accordance with the second input.

Additionally or alternatively, in some examples, the first input comprises the first user performing a gesture to grip the semaphore object in a hand of the first user. The visual representation of the assignment includes the semaphore object gripped by the hand of the first user, and moving with movement of the hand of the user.

Additionally or alternatively, in some examples, the semaphore assignment can change after the semaphore has been assigned to the first user. Change in the semaphore assignment can be requested by the first user, a second user, or can be requested by the environment in accordance with a determination that a maximum assignment duration of time associated with an assignment quota for the first user has elapsed, or for any other reason.

Another example of a change in the semaphore assignment is a request from the first user to relinquish the semaphore, and is discussed below in connection with operation 906 of FIG. 9. After a semaphore has been relinquished by the first user, computing resources hosting the environment can, within the environment, animate a transition of semaphore assignment by removing the visual representation of the assignment of the semaphore (e.g., by moving the visual representation of the semaphore away from the visual representation of the first user, and towards a semaphore receptacle). In some examples, where an environment does not include semaphore receptacles, a visual representation of a semaphore can simply move away from the visual representation of the first user (e.g., a first location corresponding to a position of the semaphore when the request to relinquish the semaphore is received), and be moved to a neutral second location that is not a location within a threshold distance DTH of the first user. In some examples, the second location is a virtual surface within environment 100 (e.g., a surface upon which the semaphore can rest). In such examples, the virtual surface within environment 100 associated with the second location can correspond to a physical surface in the physical environment of the user.

In some examples, an input from the first user to indicate a request to relinquish the semaphore can include a grip gesture (e.g., user input corresponding to gripping a visual representation of the semaphore within the environment) followed by a release gesture (e.g., user input corresponding to releasing the grip on the visual representation of the semaphore). In some examples, input to indicate a request to relinquish the semaphore can simply include a release gesture (e.g., a swiping motion directed towards a visual representation of the semaphore). In such examples, a visual representation of the semaphore can drop to the ground after being released by the first user where "the ground" refers to a virtual or physical region below the location the semaphore was last being gripped by the first user, or be returned to a semaphore receptacle.

Figure 7:
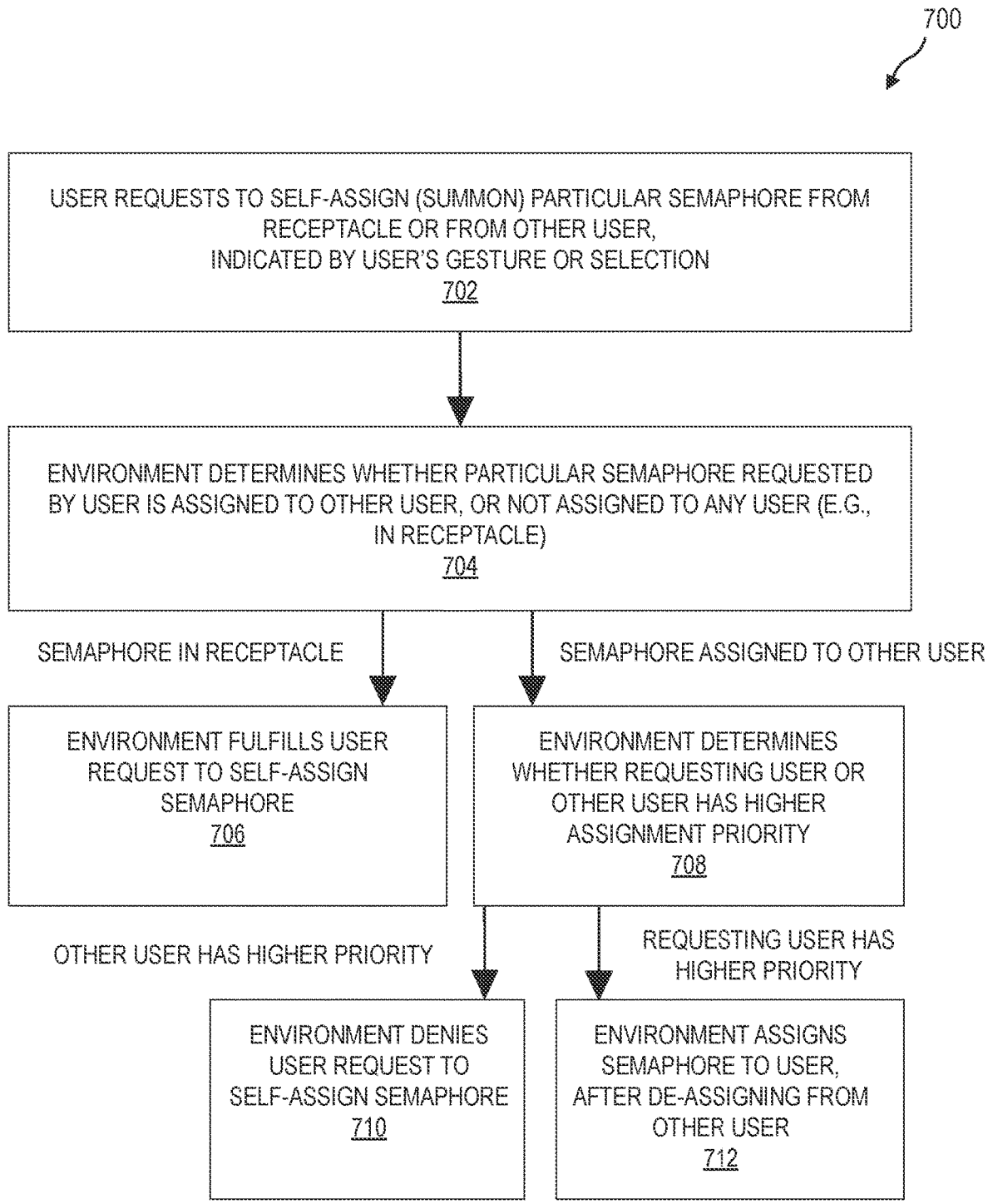
FIG. 7 illustrates an exemplary process for responding to a user request to summon or self-assign a semaphore in a multi-user collaborative environment, according to examples of the disclosure.

FIG. 7 illustrates an example process 700 for responding to a user selection/request to summon or self-assign a semaphore in a multi-user collaborative environment in accordance with some examples of the disclosure. Process 700 is optionally performed at an electronic device such as system 250, device 260, or device 270. Some operations in process 700 are optionally combined and/or optionally omitted. The order of some operations in process 700 is optionally changed, in some examples.

In some examples, process 700 is performed at a computing system in communication with a display generation component and one or more input devices. In some examples, a user within the multi-user collaborative environment requests (at operation 702), via a gesture or action corresponding to a selection, to self-assign or summon a particular semaphore. In some examples, the user can request to self-assign a particular semaphore that is assigned to another user, or a particular semaphore that is not assigned to any other user (e.g., an unassigned semaphore). In examples where the user requests to self-assign a particular semaphore that is unassigned, the user can perform a gesture of make a selection with respect to a semaphore receptacle associated with a semaphore (e.g., a gesture performed while facing the semaphore receptacle, or making a selection from graphical user elements associated with semaphore selections at the semaphore receptacle). In some examples, operation 702 can be performed by a user using device 270 (e.g., the user's computing resources), in the context of the exemplary architecture of FIG. 2. In some examples, the user request of operation 702 can include user input corresponding to a gesture to grip a visual representation of the semaphore. A user can provide input corresponding to gripping a visual representation of a semaphore that is either assigned to another user (e.g., located within a threshold distance DTH of a visual representation of the another user), or in a neutral location (e.g., a semaphore receptacle, or any location within environment that is located outside a threshold distance D'TH of any visual representation of a user). A user can optionally provide additional input corresponding to moving their grip towards themselves (e.g., as if gripping and moving the semaphore towards themselves within the environment). A processor on the computing equipment that hosts the environment can perform the remaining operations of FIG. 7 before visually representing a change in the assignment status of the semaphore within the environment, and can optionally prevent a semaphore from being moved towards a particular user who gripped it (e.g., if the particular user grips a semaphore assigned to another user with a higher priority to be assigned the semaphore, as mentioned in operation 710).

In some examples, in response to receiving the user's request to self-assign a particular semaphore, the computing system that hosts the environment (e.g., device 260, or the environment hosting resources) determines (704) whether the particular semaphore is assigned to another user, or if it is unassigned and residing in a semaphore receptacle. In some examples, in accordance with a determination that the semaphore is unassigned to any user, and is located in a semaphore receptacle, the computing system that hosts the environment fulfills (706) the user's request to self-assign the particular semaphore (e.g., similar to operation 606 of FIG. 6, where a user is assigned a particular semaphore). In other examples, in accordance with a determination that the semaphore is assigned to another user, the computing system that hosts the environment determines (708) whether the requesting user or the another user has a higher assignment priority (e.g., by consulting priority rules such as those reflected in column 410 of the user-semaphore ledger 400, of FIG. 4). In some examples, an assignment priority of a user with respect to a particular semaphore can be based on elapsed durations of time that the user has already been assigned the particular semaphore, or can be based on historical participation rates of the user associated with the particular semaphore. As an example, a first user that has been assigned a particular semaphore for two hours can have a lower priority for being assigned the particular semaphore than a second user that has been assigned the particular semaphore for less than two hours. In another example, a first user that has been assigned a particular semaphore more than a threshold amount of time can have a lower priority for being assigned the particular semaphore than a second user that has been assigned the particular semaphore for less than the threshold amount of time. In some such examples, computing resources hosting the environment can consider the priority of the second user to be greater, to improve and encourage equitable distribution of assignment of the particular semaphore to the various users over time, within the collaborative environment.

In some examples, in accordance with a determination that the another user has a higher priority associated with the particular semaphore than the requesting user (e.g., the user who made the request of operation 702), the computing system that hosts the environment denies (710) the user request to self-assign the particular semaphore. In such examples, the environment can maintain a position of the visual representation of the particular semaphore, in response to any requesting user with lower priority providing user input corresponding to gestures for gripping the semaphore, and subsequently moving their grip (e.g., as if pulling the semaphore off of the user with higher priority, towards themselves). In this way, computing resources hosting the environment can communicate to the requesting user that the requested self-assignment of the particular semaphore that is currently-assigned to another user with higher priority to be assigned the particular semaphore, has been denied. In some examples, computing resources hosting the environment 100 can update environment 100 to additionally display text in the field of view of the requesting user (and/or provide audio feedback), if/when a request for self-assignment is denied (e.g., a system can display "semaphore summons denied due to insufficient assignment priority," to the requesting user at operation 710).

In some examples, in accordance with a determination that the requesting user has a higher priority associated with the particular semaphore than the another user, the computing system that hosts the environment assigns (712) the particular semaphore to the user (e.g., similar to operation 606 of FIG. 6), after or concurrently with de-assigning the particular semaphore from the another user (e.g., the user who was previously assigned the particular semaphore). In such examples, computing resources hosting the environment can change a position of the visual representation of the particular semaphore, in response to a requesting user with higher priority providing user input corresponding to gestures for gripping the semaphore, and subsequently moving their grip (e.g., as if pulling the semaphore off of the user with higher priority, towards themselves). In this way, computing resources hosting the environment can communicate to the requesting user that the requested self-assignment of the particular semaphore that is currently-assigned to another user with lower priority to be assigned the particular semaphore has been fulfilled. In some examples, computing resources hosting environment 100 can additionally animate an emphasis of certain visual characteristics of the requesting user who is assigned the particular semaphore at operation 712 (e.g., computing resources hosting environment 100 can render an animated transition from a first representation of the requesting user with normal or de-emphasized visual characteristics, to a second representation of the requesting user with emphasized visual characteristics such as brightness, contrast, color, etc.). In some examples, computing resources hosting environment 100 can additionally animate a de-emphasis of certain visual characteristics of the representation of the user who was de-assigned the particular semaphore at operation 712 (e.g., computing resources hosting environment 100 can render an animated transition from a first representation of the de-assigned user with emphasized visual characteristics, to a second representation of the de-assigned user with normal or de-emphasized visual characteristics).

Figure 8:
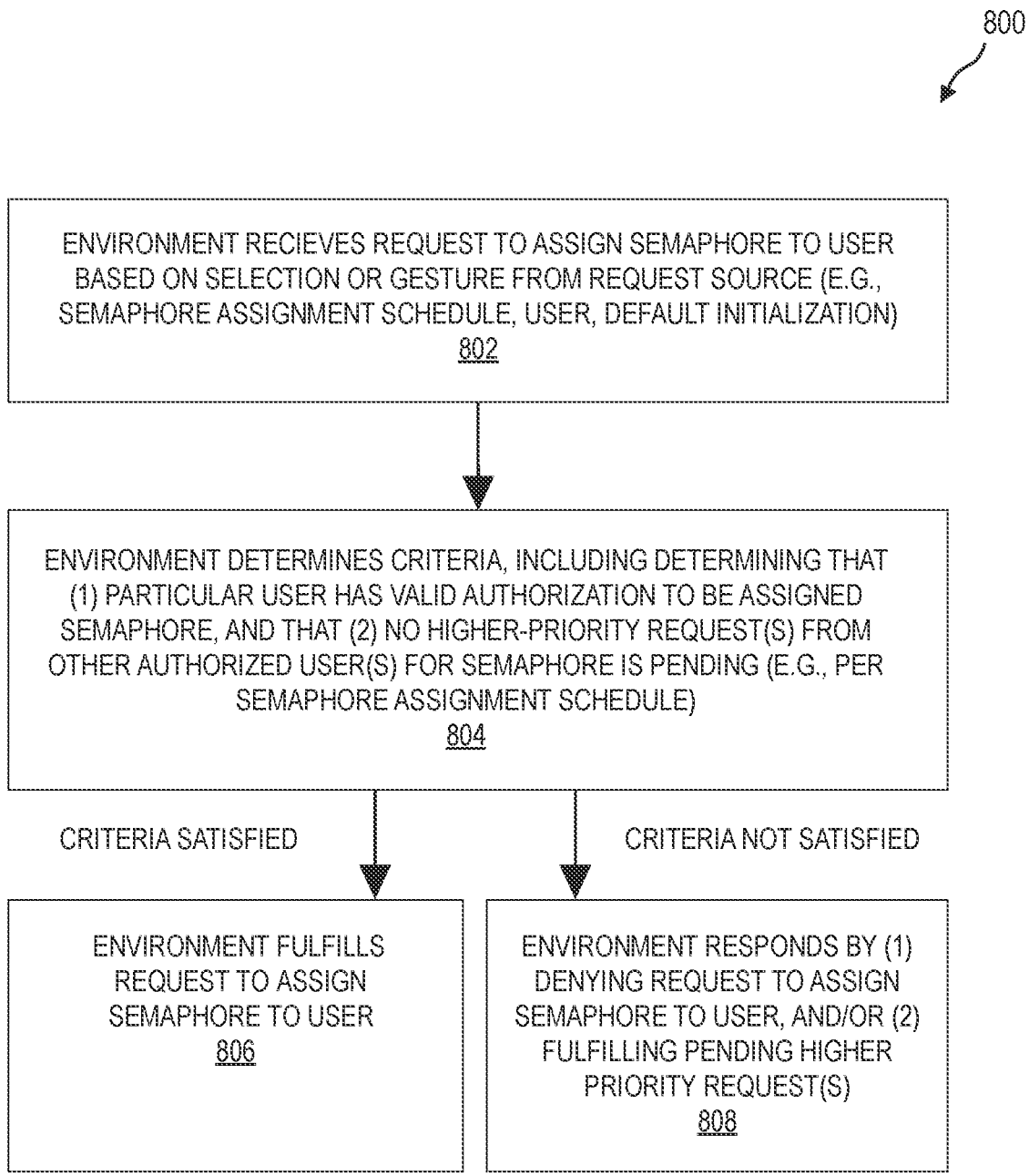
FIG. 8 illustrates an example process for responding to a user request to re-assign a self-assigned semaphore in a multi-user collaborative environment, according to examples of the disclosure.

FIG. 8 illustrates an example process 800 for responding to a user selection/request to re-assign a self-assigned semaphore in a multi-user collaborative environment in accordance with some examples of the disclosure. Process 800 is optionally performed at an electronic device such as system 250, device 260, or device 270. Some operations in process 800 are optionally combined and/or optionally omitted. The order of some operations in process 800 is optionally changed, in some examples.

In some examples, process 800 is performed at a computing system in communication with a display generation component and one or more input devices. In some examples, computing resources used to host the multi-user collaborative environment (e.g., device 260) receives (802) a request to assign a particular semaphore to a particular user. In some examples, the request received at operation 802 is based on a selection or gesture from a request source, such as a semaphore assignment schedule, another user within the environment, or as part of a default initialization setting. The request source of operation 802 can include a user-semaphore assignment maintenance engine that operates on the computing system that hosts the environment, and that maintains equity in opportunity between users of environment 100 to edit objects and their constituent content layers. As an example, the user-semaphore assignment maintenance engine may refer to user-semaphore assignment ledger 400 of FIG. 4 to determine elapsed semaphore assignment times, and to further determine semaphore assignment scheduling based on the elapsed semaphore assignment times. Semaphore assignment scheduling can refer to the automatic generation of requests to assign a particular semaphore to users such that the particular semaphore is assigned to users with the lowest elapsed assignment time with the particular semaphore or to users with the lowest participation rate associated with the particular semaphore. A participation rate for the particular semaphore can be based on a number of changes, inputs, or interactions while being assigned the particular semaphore. Computing resources hosting environment 100 can invoke and/or enforce semaphore assignment scheduling when it is determined that any of the users has been assigned any particular semaphore in excess of a threshold duration of time (e.g., an assignment quota time) associated with the particular semaphore.

In some examples, semaphore assignment scheduling can be implemented by determining a given user within the environment with the lowest participation rate, or total elapsed assignment time with respect to a particular semaphore. A request to assign the particular semaphore to that given user can be generated. Other users can be allowed to summon (e.g., request to self-assign) the particular semaphore on a temporary basis (e.g., the semaphore is returned to the given user after a period of time that the particular semaphore is assigned to a different user). As an example, the given user with the lowest participation rate or elapsed assignment time can be assigned a particular semaphore, and another user can request the particular semaphore from the given user. The another user can be assigned the particular semaphore for a duration of time, after which the given user is re-assigned the particular semaphore. Alternatively or additionally, the another user can be assigned the particular semaphore until the another user has participated (e.g., contributed changes, made edits, or otherwise modified any of the objects within the environment) a threshold amount, after which the given user is re-assigned the particular semaphore.

In some examples, the computing system that hosts the environment (e.g., device 260, or the environment hosting resources) determines (804) one or more criteria including whether the particular user (e.g., the user who is the target/subject of the assignment request received in operation 802) has valid authorization to be assigned the particular semaphore, and whether any higher-priority request(s) from other authorized user(s) associated with assigning the particular semaphore are currently pending (e.g., specified in a semaphore assignment schedule, or required per rules listed in column 410 of a user-semaphore assignment ledger). In such examples, the environment determines that the particular user has valid authorization to be assigned the particular semaphore (e.g., satisfaction of a first criterion), and additionally determines that no high-priority request(s) from any other authorized user is pending (e.g., satisfaction of a second criterion). In some examples, in response to a determination that the criteria of operation 804 are satisfied, the computing system that hosts the environment can fulfill (806) the received request to assign the particular semaphore to the particular user. In some examples, in response to a determination that the criteria of operation 804 are not satisfied, the computing system that hosts the environment can respond (808) to the received request by denying the request to assign the particular semaphore to the particular user, and/or fulfilling any of the pending request(s) associated with assigning the particular semaphore that were discovered in operation 804.

Figure 9:
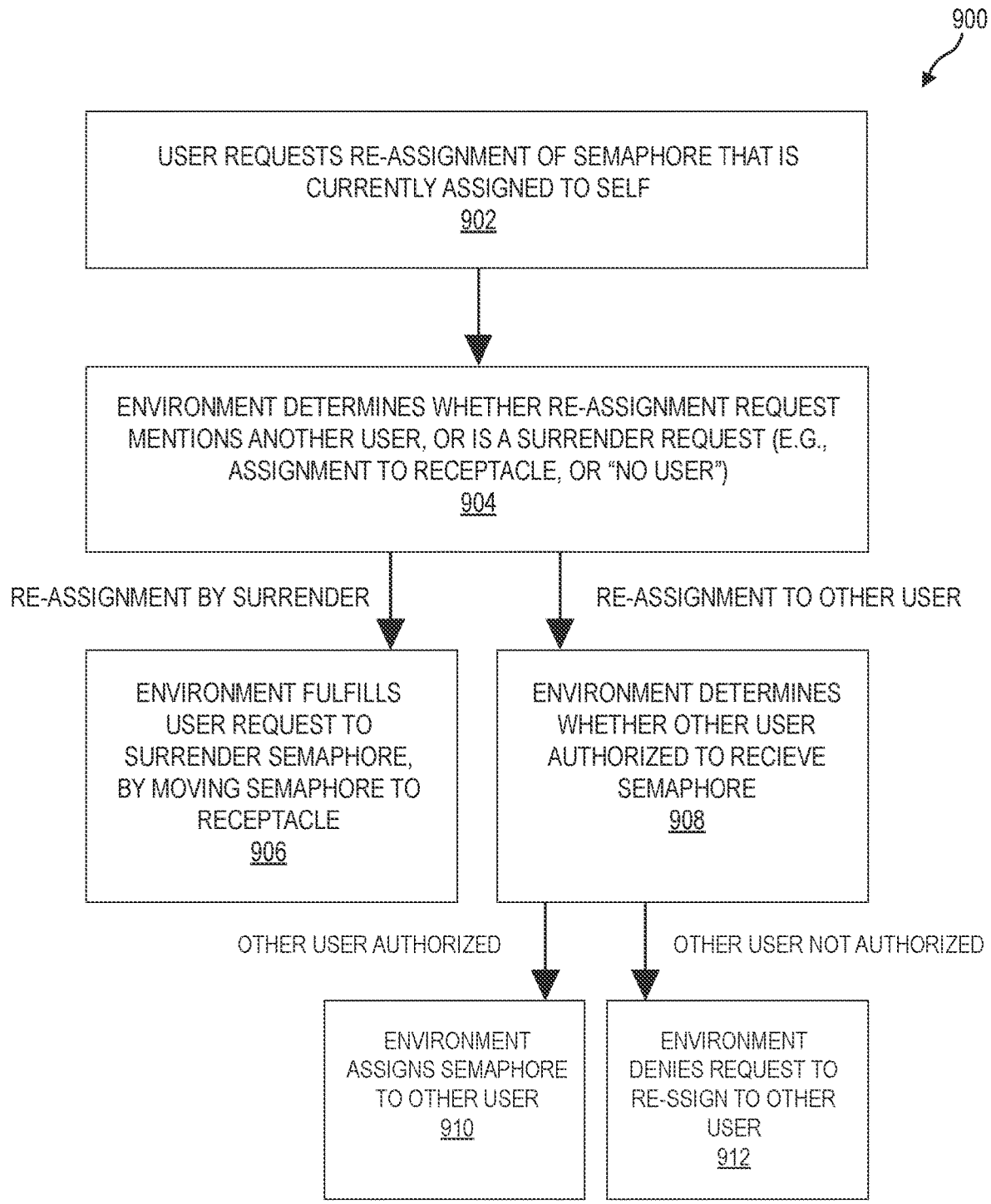
FIG. 9 illustrates an example process for responding to a request from a particular user to transfer assignment of a particular semaphore that is currently assigned to the particular in a multi-user collaborative environment, according to examples of the disclosure.

FIG. 9 illustrates an example process 900 for responding to a request from a particular user to transfer assignment of a particular semaphore that is currently assigned to the particular user in a multi-user collaborative environment in accordance with some examples of the disclosure. In some examples, the process of FIG. 9 refers to responding to a user request to transfer assignment of a self-assigned semaphore. Process 900 is optionally performed at an electronic device such as system 250, device 260, or device 270. Some operations in process 900 are optionally combined and/or optionally omitted. The order of some operations in process 900 is optionally changed, in some examples.

In some examples, process 900 is performed at a computing system in communication with a display generation component and one or more input devices. In some examples, a user who is currently assigned a particular semaphore requests (at operation 902) re-assignment of the particular semaphore. In some examples, the request received at operation 902 is based on a selection or gesture from the user (e.g., a user input received from device 270). In some examples, gesture from the user includes user input corresponding to a grip gesture on the particular semaphore that is located within a threshold distance DTH of a visual representation of the user, by virtue of being currently-assigned to the user.

In some examples, the computing system that hosts the environment (e.g., device 260, or the environment hosting resources) determines (904) whether the re-assignment request received in operation 902 makes mention of any target user (e.g., the request specifies another user to whom the particular semaphore should be assigned), or whether the re-assignment request is a surrender request (e.g., the request specifies that no user should be assigned the particular semaphore, or specifies that the particular semaphore should be returned to its associated semaphore receptacle). In some examples, the computing system that hosts the environment can detect user input that indicates the nature of the re-assignment request received in operation 902. In some examples, user input corresponding to a release gesture that is directed towards the visual representation of the semaphore, can indicate to the computing system that the re-assignment request received in operation 902 corresponds to a request to surrender or relinquish the semaphore. In some examples, user input corresponding to a grip gesture on a visual representation of the semaphore, followed by user input corresponding to a release of the grip gesture, can also indicate to the computing system that the re-assignment request received in operation 902 corresponds to a request to surrender or relinquish the semaphore.

In some examples, in accordance with a determination that the re-assignment request is a request to surrender the particular semaphore, the computing system that hosts the environment can fulfill (906) the user request of operation 902 by de-assigning the particular semaphore from the user, and returning the particular semaphore to its associated semaphore receptacle (e.g., animating the particular semaphore being relocated to the semaphore receptacle). In other examples, the computing system that hosts the environment can fulfill the user request of operation 902 by de-assigning the particular semaphore from the user, and moving the particular semaphore to any second position or location that is not, or that is different from, any position or location within a threshold distance DTH from a visual representation of the user (e.g., a semaphore within the threshold distance indicating that the particular semaphore is assigned to the user). In some examples, in which an environment does not contain semaphore receptacles, or where particular associations between semaphores and semaphore receptacles are not clearly defined or established within the environment, the second position or location that the semaphore is moved to upon being surrendered or relinquished by the user is below its location at the time of its surrender by the user (e.g., the semaphore can drop away from the user).

In some examples, user input corresponding to a grip gesture on a visual representation of the semaphore, followed by user input corresponding to a directional release of the grip gesture (e.g., a throw gesture), can indicate to the computing system that the re-assignment request received in operation 902 corresponds to a request to re-assign the semaphore to another user. In such examples, the intended user targeted for the re-assignment can be determined based on the direction of the throw (e.g., the system interprets that the user is requesting that the semaphore be assigned to the other user towards whom the semaphore is being thrown). In some examples, in accordance with a determination that the re-assignment request is a request to re-assign the particular semaphore to another user, the computing system that hosts the environment determines (908) whether the another user is authorized to receive or be assigned the particular semaphore (e.g., by checking rules listed in column 410 of a user-semaphore assignment ledger). In some examples, in accordance with a determination that the another user is authorized to be assigned the particular semaphore, the computing system that hosts the environment assigns (910) the particular semaphore to the another user, thereby fulfilling the request received in operation 902. In some examples, in accordance with a determination that the another user is not authorized to be assigned the particular semaphore, the computing system that hosts the environment denies (910) the particular semaphore the request received in operation 902, and does not re-assign the particular semaphore to any other user.

Figure 10:
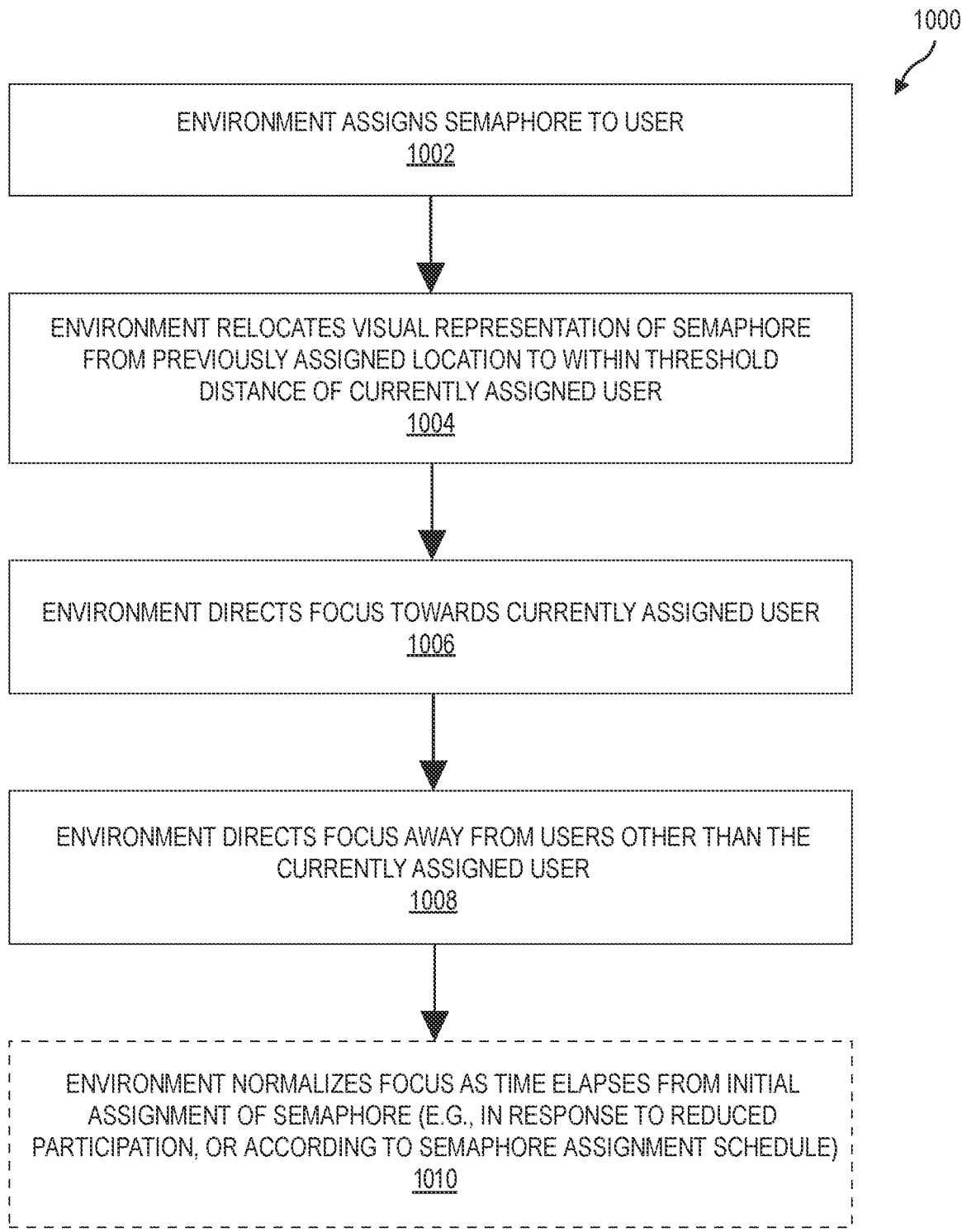
FIG. 10 illustrates an example process for modifying the presentation of visual representations of a user in a multi-user collaborative environment in response to a semaphore assignment to the user, according to examples of the disclosure.

FIG. 10 illustrates an example process 1000 for modifying the presentation of visual representations of a user in a multi-user collaborative environment, in response to a semaphore assignment to the user, in accordance with examples of the disclosure. In some examples, the process of FIG. 10 refers to modifying one or more visual attributes of an environment (e.g., environment 100). Process 1000 is optionally performed at an electronic device such as system 250, device 260, or device 270. Some operations in process 1000 are optionally combined and/or optionally omitted. The order of some operations in process 1000 is optionally changed, in some examples.

In some examples, process 1000 is performed at a computing system in communication with a display generation component and one or more input devices. In some examples, the computing system that hosts the environment (e.g., device 260, or the environment hosting resources) assigns (1002) a particular semaphore to a particular user (e.g., a new user-semaphore assignment is established within the environment). In some examples, the computing system that hosts the environment relocates (1004) a visual representation of the particular semaphore from a previously assigned location (e.g., another user, or a semaphore receptacle) to within a threshold distance (e.g., DTH of FIG. 3B) of the particular user. In some examples, the computing system that hosts the environment directs (1006) focus towards the particular user that is assigned the particular semaphore. In some examples, the environment can direct focus towards the particular user by visually emphasizing a representation of the particular user within the multi-user collaborative environment, and/or by visually de-emphasizing representations of users other than the particular user. Visually emphasizing or de-emphasizing representations of users can refer to changing one or more visual attributes of the representations, such as brightness, contrast, sharpness, opacity, etc.

In some examples, the environment can direct focus towards the particular user by emphasizing an audio input stream associated with the particular user within the multi-user collaborative environment, and/or by de-emphasizing or attenuating audio input streams associated with users other than the particular user. Emphasizing or de-emphasizing audio input streams of users can refer to changing one or more playback attributes of the audio input streams, such as volume, pitch, clarity, etc. In some examples, audio input streams associated with users can refer to microphone inputs of the users that are played back within the environment to other users.

In some examples, the computing system that hosts the environment directs (1008) focus away from users other than the particular user (e.g., by visually de-emphasizing their representations, or by de-emphasizing their associated audio input streams).

In some examples, the computing system that hosts the environment normalizes (1010) focus as time from the initial assignment of the particular semaphore to the particular user elapses. In some examples, normalizing focus as time elapses can refer to reversing any emphasis or de-emphasis to a user's visual representation and/or audio input stream over time. As an example, when at operation 1006, the computing system that the environment directs focus towards a user assigned a semaphore, a visual representation and/or audio input stream of the user can be emphasized (e.g., relative to the visual representations and/or audio input streams of other users, which can be optionally de-emphasized). Over time, a number of considerations or factors can result in the changes made to emphasize the visual representation and/or audio input stream of the user being reversed.

An example of a consideration/factor that can result in reversal of the emphasis of the user's visual representation and/or audio input stream is time (e.g., as time from the initial direction of focus to the user at operation 1006 elapses, the emphasis is reversed). In some examples, when reversal of emphasis to the user's visual representation and/or audio input stream occurs over time, the computing system that hosts the environment can completely reverse the emphasis over the course of a predetermined duration (e.g., an assignment quota duration associated with the user, sometimes indicated by the user-semaphore assignment ledger of FIG. 4).

Another example of a consideration/factor that can result in reversal of the emphasis of the user's visual representation and/or audio input stream is a participation rate of the user. In some examples, when reversal of emphasis to the user's visual representation and/or audio input stream occurs based on a participation rate of the user (e.g., the focus directed towards user at operation 1006 is maintained based on the participation rate of the user remaining above a certain threshold rate).

In some examples, when reversal of emphasis to the user's visual representation and/or audio input stream occurs based on the user's participation rate, the computing system that hosts the environment can reverse the emphasis in response to determining that the user's participation rate has dropped below a certain threshold rate (e.g., a rate of making changes to an object layer associated with a semaphore assigned to the user, or a rate of interacting with other users in the environment).

Figure 11:
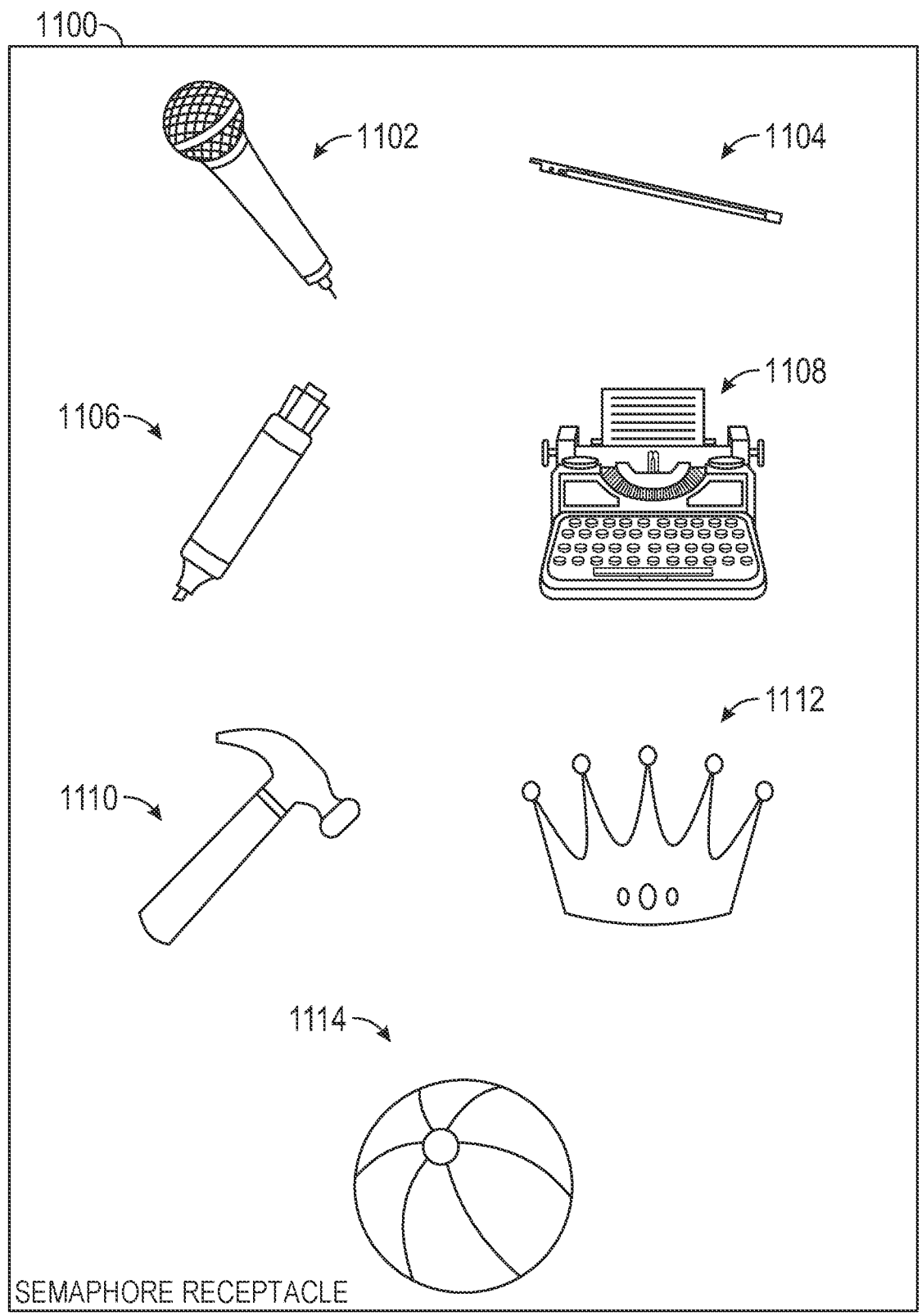
FIG. 11 illustrates an exemplary semaphore receptacle with multiple different semaphores associated with an object that includes multiple content layer types, according to examples of the disclosure.

FIG. 11 illustrates an exemplary semaphore receptacle with multiple different semaphores each having respective visual representations within a multi-user collaborative environment, associated with an object that includes multiple content layer types, in accordance with examples of the disclosure. Semaphore receptacle 1100 can represent any of the semaphore receptacles described in connection with FIG. 1, 3A, or 3B, such as semaphore receptacle 112 that is associated with object 104A of FIG. 1.

Semaphore receptacle 1100 associated with a multi-layered object can have at least one semaphore corresponding to every editable layer of the object, in some examples. FIG. 11 does not illustrate duplicated semaphores, to avoid unnecessary obfuscation of the presently highlighted features of the disclosure. Any of the semaphores within semaphore receptacle 1100 can be held by one hand or two hands of a user within the environment. In some examples, the semaphores within semaphore receptacle 1100, when assigned to a user, can be attached to a visual representation of the user without requiring that a user's grip be maintained on the semaphore. In some examples, a user can grip a semaphore to perform a gesture or make a selection corresponding to a re-assignment of the semaphore (e.g., assigning a semaphore to another user, summoning or self-assigning a semaphore, or surrendering a semaphore to return the semaphore to its receptacle). In some examples, when a semaphore is assigned to a particular user, the semaphore can be tethered to a location within a threshold distance DTH of a visual representation of the particular user (e.g., as if attached to the visual representation of the particular user), without requiring the user to actively grip the semaphore (e.g., the user is able to wield any assigned semaphores hands-free). Semaphore 1102 can have a visual representation similar to a microphone, or generally, a baton-like object that can be wielded by a user in one hand (e.g., when the semaphore is gripped to perform a gesture or make a re-assignment selection). In some examples, semaphore 1102 can confer write access privileges to a user for editing one or more audio layers of an editable object (e.g., audio layers associated with human voice).

Semaphore 1104 can have a visual representation similar to a violin bow, or an object related to a musical instrument that can be wielded by a user in one hand (e.g., when the semaphore is gripped to perform a gesture or make a re-assignment selection). In some examples, semaphore 1104 can confer write access privileges to a user for editing one or more audio layers of an editable object (e.g., audio layers associated with music).

Semaphore 1106 can have a visual representation similar to a marker, pen, pencil, or other writing implement that can be wielded by a user in one hand (e.g., when the semaphore is gripped to perform a gesture or make a re-assignment selection). In some examples, semaphore 1106 can confer write access privileges to a user for editing one or more graphical layers of an editable object (e.g., layers associated with graphics, images, drawings, etc.).

Semaphore 1108 can have a visual representation similar to a typewriter, or an object related to word processing that can be wielded by a user in one hand (e.g., when the semaphore is gripped to perform a gesture or make a re-assignment selection). In some examples, semaphore 1108 can confer write access privileges to a user for editing one or more text layers of an editable object.

Semaphore 1110 can have a visual representation similar to a hammer, or an object/tool related to construction that can be wielded by a user in one hand (e.g., when the semaphore is gripped to perform a gesture or make a re-assignment selection). In some examples, semaphore 1110 can confer write access privileges to a user for editing one or more modeling layers of an editable object (e.g., a 3-dimensional model of an object).

Semaphore 1112 can have a visual representation similar to a crown that can be wielded by a user in one hand (e.g., when the semaphore is gripped to perform a gesture or make a re-assignment selection). In some examples, semaphore 1112 can confer write access privileges to a user for editing any layers of an editable object (e.g., a semaphore that confers write access privileges to any/every layer of an editable object).

Other visual representations of semaphores can be contemplated, such as spherical shapes (e.g., as illustrated in connection with semaphore 1114), cylindrical shapes, prism-shaped objects, or any other solid shape. Some visual representations of semaphores can be generic, and not specifically related to the content layer of an editable object that they confer write access privileges for.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A method, comprising:
   at a computing system in communication with a display and one or more input devices;
      presenting a multi-user collaborative environment including an editable object and a first semaphore object that corresponds to one or more first tasks associated with the editable object;
      receiving a first input from a first user requesting to acquire the first semaphore object;
      assigning the first semaphore object to the first user in accordance with the first input, wherein assignment of the first semaphore object includes a visual representation of the assignment of the first semaphore object within the multi-user collaborative environment that moves within the multi-user collaborative environment in accordance with movement of the first user;
      receiving a second input requesting to modify the editable object corresponding to the one or more first tasks associated with the editable object;
      in accordance with a determination that the second input is from the first user to which the first semaphore object is assigned and directed to the one or more first tasks, modifying the editable object in accordance with the second input; and
      in accordance with a determination that the second input is from a second user to which the first semaphore object is not assigned or is from the first user to which the first semaphore object is assigned but directed to one or more second tasks not corresponding to first semaphore object, forgoing modifying the editable object in accordance with the second input.

2. The method of claim 1, wherein the first input comprises the first user performing a gesture, and wherein the visual representation of the assignment to the first user comprises changing an appearance of a virtual representation of the first user within the multi-user collaborative environment.

3. The method of claim 1, further comprising:
   receiving a third input from the first user requesting to relinquish the first semaphore object; and
   removing the assignment of the first semaphore object from the first user in accordance with the third input, wherein removing the assignment of the first semaphore object from the first user includes ceasing to display the visual representation of the assignment within the multi-user collaborative environment.

4. The method of claim 3, further comprising:
   moving, in response to the third input, the first semaphore object from a first location corresponding to position of the first semaphore object when the third input is received to a second location different from the first location.

5. The method of claim 1, further comprising:
   while the first semaphore object is associated with the first user, receiving a third input requesting a transfer assignment of the first semaphore object to the second user; and
   in accordance with a determination that one or more first criteria are satisfied, assigning the first semaphore object to the second user in accordance with the third input, wherein assignment of the first semaphore object includes the visual representation of the assignment within the multi-user collaborative environment that moves within the multi-user collaborative environment in accordance with movement of the second user.

6. The method of claim 1, further comprising:
   while the first semaphore object is associated with the first user, an audio level of the second user is attenuated compared with an audio level of the first user.

7. The method of claim 1, wherein the visual representation of the assignment to the first user comprises changing an appearance of a virtual representation of the first user within the multi-user collaborative environment.

8. The method of claim 1, further comprising:
   presenting the multi-user collaborative environment including a second semaphore object that corresponds to the one or more second tasks associated with the editable object;
   receiving a third input from a second user requesting to acquire the second semaphore object;
   assigning the second semaphore object to the second user in accordance with the third input, wherein assignment of the second semaphore object includes a visual representation of the assignment of the second semaphore object within the multi-user collaborative environment that moves within the multi-user collaborative environment in accordance with movement of the second user;
   receiving a fourth input requesting to modify the editable object corresponding to the one or more second tasks associated with the editable object;
   in accordance with a determination that the fourth input is from the second user to which the second semaphore object is assigned directed to the one or more second tasks, modifying the editable object in accordance with the fourth input; and
   in accordance with a determination that the fourth input is from the first user to which the second semaphore object is not assigned or is from the second user to which the second semaphore object is assigned but directed to the one or more first tasks not corresponding with the second semaphore object, forgoing modifying the editable object in accordance with the fourth input.

9. A non-transitory computer readable storage medium storing instructions, which when executed by one or more processors of a computing system with a display and one or more input devices, cause the one or more processors to:

present a multi-user collaborative environment including an editable object and a first semaphore object that corresponds to one or more first tasks associated with the editable object;
receive a first input from a first user requesting to acquire the first semaphore object;
assign the first semaphore object to the first user in accordance with the first input, wherein assignment of the first semaphore object includes a visual representation of the assignment of the first semaphore object within the multi-user collaborative environment that moves within the multi-user collaborative environment in accordance with movement of the first user;
receive a second input requesting to modify the editable object corresponding to the one or more first tasks associated with the editable object;
in accordance with a determination that the second input is from the first user to which the first semaphore object is assigned and directed to the one or more first tasks, modify the editable object in accordance with the second input; and
in accordance with a determination that the second input is from a second user to which the first semaphore object is not assigned or is from the first user to which the first semaphore object is assigned but directed to one or more second tasks not corresponding to first semaphore object, forgo modifying the editable object in accordance with the second input.

10. The non-transitory computer readable storage medium of claim 9, wherein the first input comprises the first user performing a gesture, and wherein the visual representation of the assignment to the first user comprises changing an appearance of a virtual representation of the first user within the multi-user collaborative environment.

11. The non-transitory computer readable storage medium of claim 9, wherein the instructions, when executed by the one or more processors of the computing system, further cause the one or more processors to: and
receive a third input from the first user requesting to relinquish the first semaphore object;
remove the assignment of the first semaphore object from the first user in accordance with the third input, wherein removing the assignment of the first semaphore object from the first user includes ceasing to display the visual representation of the assignment within the multi-user collaborative environment.

12. The non-transitory computer readable storage medium of claim 11, wherein the instructions, when executed by the one or more processors of the computing system, further cause the one or more processors to:
move, in response to the third input, the first semaphore object from a first location corresponding to position of the first semaphore object when the third input is received to a second location different from the first location.

13. The non-transitory computer readable storage medium of claim 9, wherein the instructions, when executed by the one or more processors of the computing system, further cause the one or more processors to:
while the first semaphore object is associated with the first user, receive a third input requesting a transfer assignment of the first semaphore object to the second user; and
in accordance with a determination that one or more first criteria are satisfied, assign the first semaphore object to the second user in accordance with the third input, wherein assignment of the first semaphore object includes the visual representation of the assignment within the multi-user collaborative environment that moves within the multi-user collaborative environment in accordance with movement of the second user.

14. The non-transitory computer readable storage medium of claim 9, wherein the instructions, when executed by the one or more processors of the computing system, further cause the one or more processors to:
present the multi-user collaborative environment including a second semaphore object that corresponds to the one or more second tasks associated with the editable object;
receive a third input from a second user requesting to acquire the second semaphore object;
assign the second semaphore object to the second user in accordance with the third input, wherein assignment of the second semaphore object includes a visual representation of the assignment of the second semaphore object within the multi-user collaborative environment that moves within the multi-user collaborative environment in accordance with movement of the second user;
receive a fourth input requesting to modify the editable object corresponding to the one or more second tasks associated with the editable object;
in accordance with a determination that the fourth input is from the second user to which the second semaphore object is assigned directed to the one or more second tasks, modify the editable object in accordance with the fourth input; and
in accordance with a determination that the fourth input is from the first user to which the second semaphore object is not assigned or is from the second user to which the second semaphore object is assigned but directed to the one or more first tasks not corresponding with the second semaphore object, forgo modifying the editable object in accordance with the fourth input.

15. An electronic device comprising:
one or more processors;
a display;
one or more input devices;
non-transitory memory; and
one or more programs, wherein the one or more programs are stored in the non-transitory memory and configured to be executed by the one or more processors, the one or more programs including instructions for:
presenting a multi-user collaborative environment including an editable object and a first semaphore object that corresponds to one or more first tasks associated with the editable object;
receiving a first input from a first user requesting to acquire the first semaphore object;
assigning the first semaphore object to the first user in accordance with the first input, wherein assignment of the first semaphore object includes a visual representation of the assignment of the first semaphore object within the multi-user collaborative environment that moves within the multi-user collaborative environment in accordance with movement of the first user;
receiving a second input requesting to modify the editable object corresponding to the one or more first tasks associated with the editable object;
in accordance with a determination that the second input is from the first user to which the first semaphore object is assigned and directed to the one or more first tasks, modifying the editable object in accordance with the second input; and in accordance with a determination that the second input is from a second user to which the first semaphore object is not assigned or is from the first user to which the first semaphore object is assigned but directed to one or more second tasks not corresponding to first semaphore object, forgoing modifying the editable object in accordance with the second input.

16. The electronic device of claim 15, wherein the first input comprises the first user performing a gesture, and wherein the visual representation of the assignment to the first user comprises changing an appearance of a virtual representation of the first user within the multi-user collaborative environment.

17. The electronic device of claim 15, wherein the instructions are further for:

receiving a third input from the first user requesting to relinquish the first semaphore object; and removing the assignment of the first semaphore object from the first user in accordance with the third input, wherein removing the assignment of the first semaphore object from the first user includes ceasing to display the visual representation of the assignment within the multi-user collaborative environment.

18. The electronic device of claim 17, wherein the instructions are further for:

moving, in response to the third input, the first semaphore object from a first location corresponding to position of the first semaphore object when the third input is received to a second location different from the first location.

19. The electronic device of claim 15, wherein the instructions are further for:

while the first semaphore object is associated with the first user, receiving a third input requesting a transfer assignment of the first semaphore object to the second user; and in accordance with a determination that one or more first criteria are satisfied, assigning the first semaphore object to the second user in accordance with the third input, wherein assignment of the first semaphore object includes the visual representation of the assignment within the multi-user collaborative environment that moves within the multi-user collaborative environment in accordance with movement of the second user.

20. The electronic device of claim 15, wherein the instructions are further for:

presenting the multi-user collaborative environment including a second semaphore object that corresponds to the one or more second tasks associated with the editable object;

receiving a third input from a second user requesting to acquire the second semaphore object;

assigning the second semaphore object to the second user in accordance with the third input, wherein assignment of the second semaphore object includes a visual representation of the assignment of the second semaphore object within the multi-user collaborative environment that moves within the multi-user collaborative environment in accordance with movement of the second user;

receiving a fourth input requesting to modify the editable object corresponding to the one or more second tasks associated with the editable object;

in accordance with a determination that the fourth input is from the second user to which the second semaphore object is assigned directed to the one or more second tasks, modifying the editable object in accordance with the fourth input; and in accordance with a determination that the fourth input is from the first user to which the second semaphore object is not assigned or is from the second user to which the second semaphore object is assigned but directed to the one or more first tasks not corresponding with the second semaphore object, forgoing modifying the editable object in accordance with the fourth input.

\* \* \* \* \*